United States Patent
Rhee et al.

(10) Patent No.: US 9,727,225 B2
(45) Date of Patent: Aug. 8, 2017

(54) METHOD AND APPARATUS FOR CONTROLLING CONTENT USING GRAPHICAL OBJECT

(75) Inventors: Taik Heon Rhee, Seoul (KR); Sang Il Lee, Gyeonggi-do (KR); Dong Jin Eun, Gyeonggi-do (KR); Sung Bin Kuk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/546,681

(22) Filed: Jul. 11, 2012

(65) Prior Publication Data

US 2013/0019193 A1 Jan. 17, 2013

(30) Foreign Application Priority Data

Jul. 11, 2011 (KR) .................. 10-2011-0068378
Nov. 30, 2011 (KR) .................. 10-2011-0127279

(51) Int. Cl.
*G06F 3/0486* (2013.01)
*G06F 3/0488* (2013.01)

(52) U.S. Cl.
CPC ........ *G06F 3/0486* (2013.01); *G06F 3/04883* (2013.01); *G06F 3/04886* (2013.01); *G06F 2203/04806* (2013.01)

(58) Field of Classification Search
CPC .................................................... G06F 3/0486
(Continued)

(56) References Cited

U.S. PATENT DOCUMENTS 7,106,464 B1* 9/2006 Brylov .................. 358/1.15

7,458,032 B2* 11/2008 Terada .................. G06F 3/0486
715/769
(Continued)

FOREIGN PATENT DOCUMENTS

CN 101751286 6/2010
CN 102037450 4/2011
(Continued)

OTHER PUBLICATIONS

Gonzalez, Barb, "What is Airplay and What Do You Need to Use it?", Mar. 13, 2011, http://hometheater.about.com/od/internethometheater2/a/What-Is-Apple-Airplay-How-Airplay-works.htm.*

(Continued)

*Primary Examiner* — Reza Nabi
*Assistant Examiner* — Daniel Rodriguez
(74) *Attorney, Agent, or Firm* — The Farrell Law Firm, P.C.

(57) ABSTRACT

A method and apparatus for controlling content using a graphical object in a mobile terminal are provided, in which the user may create a graphical object on the screen through touch input and easily apply various actions such as copy, delete, move, transfer, attribute change and compress to content items by means of the created graphical object. The content control method includes: detecting a preset touch input; creating a graphical object at a region where the touch input is detected; determining a mode of the created graphical object; linking at least one content item on the screen with the graphical object; and controlling the content item linked therewith depending on the mode of the graphical object. Hence, the user can control a mobile terminal through touch inputs in a more convenient and intuitive manner, increasing user convenience.

22 Claims, 26 Drawing Sheets

(58) Field of Classification Search
USPC .......................................................... 715/769
See application file for complete search history.

(56) References Cited

U.S. PATENT DOCUMENTS

| | | | |
|---|---|---|---|
| 7,533,352 B2 | 5/2009 | Chew et al. | |
| 8,473,862 B1* | 6/2013 | Davidson | G06F 3/0416 715/769 |
| 2003/0163574 A1* | 8/2003 | Tohki et al. | 709/228 |
| 2004/0154014 A1* | 8/2004 | Bunger | 717/174 |
| 2007/0180400 A1* | 8/2007 | Zotov et al. | 715/788 |
| 2008/0036743 A1 | 2/2008 | Westerman et al. | |
| 2009/0073144 A1 | 3/2009 | Chen et al. | |
| 2009/0254855 A1 | 10/2009 | Kretz et al. | |
| 2009/0309849 A1 | 12/2009 | Iwema et al. | |
| 2009/0327964 A1 | 12/2009 | Mouilleseaux et al. | |
| 2010/0004031 A1* | 1/2010 | Kim | H04M 1/274525 455/566 |
| 2010/0079395 A1 | 4/2010 | Kim et al. | |
| 2010/0083111 A1* | 4/2010 | de los Reyes | G06F 3/0482 715/702 |
| 2010/0138743 A1 | 6/2010 | Chou | |
| 2010/0211920 A1* | 8/2010 | Westerman et al. | 715/863 |
| 2010/0229129 A1* | 9/2010 | Price | G06F 3/04883 715/863 |
| 2010/0241979 A1* | 9/2010 | Apted | G06F 3/0481 715/765 |
| 2010/0281395 A1 | 11/2010 | Apted | |
| 2010/0309512 A1 | 12/2010 | Onoda | |
| 2011/0014934 A1* | 1/2011 | Rybak et al. | 455/466 |
| 2011/0034208 A1 | 2/2011 | Gu et al. | |
| 2011/0055754 A1* | 3/2011 | Nicholas et al. | 715/810 |
| 2011/0066976 A1 | 3/2011 | Hwang | |
| 2011/0102458 A1* | 5/2011 | Takiguchi et al. | 345/629 |
| 2011/0134047 A1* | 6/2011 | Wigdor et al. | 345/173 |
| 2011/0154196 A1* | 6/2011 | Icho | G06F 3/0485 715/702 |
| 2011/0163944 A1* | 7/2011 | Bilbrey | G01D 21/02 345/156 |
| 2011/0164029 A1* | 7/2011 | King | G06F 3/04883 345/419 |
| 2011/0175822 A1* | 7/2011 | Poon | G06F 3/04842 345/173 |
| 2011/0193788 A1* | 8/2011 | King et al. | 345/173 |
| 2011/0197153 A1* | 8/2011 | King et al. | 715/769 |
| 2011/0205169 A1* | 8/2011 | Yasutake | G06F 3/03547 345/173 |
| 2011/0246538 A1* | 10/2011 | Boley | G06F 17/30398 707/805 |
| 2012/0026100 A1* | 2/2012 | Migos et al. | 345/173 |
| 2012/0030570 A1* | 2/2012 | Migos | G06F 3/04883 715/702 |
| 2012/0054674 A1* | 3/2012 | Beykpour et al. | 715/788 |
| 2012/0131500 A1* | 5/2012 | Fujisawa | G06F 3/04817 715/800 |
| 2013/0093792 A1* | 4/2013 | Davidson | G06F 3/0416 345/650 |
| 2013/0191711 A1* | 7/2013 | Tashman et al. | 715/205 |
| 2013/0198051 A1* | 8/2013 | Nicholas, III | G06F 3/0481 705/35 |

FOREIGN PATENT DOCUMENTS

| | | |
|---|---|---|
| EP | 1 026 574 | 8/2000 |
| EP | 1840707 | 10/2007 |
| EP | 1840707 A1 * | 10/2007 |
| EP | 2 060 970 | 5/2009 |
| EP | 2 192 478 | 6/2010 |
| KR | 20030048946 | 6/2003 |
| RU | 2 415 463 | 3/2011 |

OTHER PUBLICATIONS

Gonzalez, Barb, "What is Airplay and What Do You Need to Use it?", Mar. 13, 2011, http://hometheaterabout.com/od/internethometheater2/a/What-Is-Apple-Airplay-How-Airplay-works.htm.*

Gordon, Whitson, "How to Make Your Entire Home AirPlay-Compatible", May 21, 2011, http://lifehacker.com/5802958/how-to-make-your-entire-home-airplay+compatible.*

Apple, "iPhone Buttons", Oct. 20, 2008, http://support.apple.com/kb/TA38625.*

Lopez, Gerardo, "How to Use the OpenFileDialog Box in VB.NET", Sep. 7, 2009, http://www.brangle.com/wordpress/2009/09/howto-use-the-openfiledialog-box-in-vbnet/.*

Rusen, Ciprian Adrian, "Sharing Between Windows Vista and Windows 7 Computers", Feb. 17, 2010, http://www.7tutorials.com/sharing-between-windows-vista-and-windows-7-computers.*

Gonzalez, Barb, "What is Airplay and What Do You Need to Use it?", available at <http://hometheaterabout.com/od/internethometheater2/a/What-Is-Apple-Airplay-How-Airplay-works.htm>, archived on Mar. 13, 2011 at wayback machine <http://web.archived.org>, 2 pages.*

Gordon, Whitson, "How to Make Your Entire Home AirPlay-Compatible", available at <http://lifehacker.com/5802958/how-to-make-your-entire-home-airplay+compatible>, archived on May 21, 2011 at wayback machine <http://web.archived.org>, 4 pages.*

Apple, "iPhone Buttons", available at <http://support.apple.com/kb/TA38625>, archived on Oct. 20, 2008 at wayback machine <http://web.archive.org>, 2 pages.*

Lopez, Gerardo, "How to Use the OpenFileDialog Box in VB.NET", available at <http://www.brangle.com/wordpress/2009/09/howto-use-the-openfiledialog-box-in-vbnet/>, posted on Sep. 7, 2009, 3 pages.*

Rusen, Ciprian Adrian, "Sharing Between Windows Vista and Windows 7 Computers", Feb. 17, 2010, available at <http://www.7tutorials.com/sharing-between-windows-vista-and-windows-7-computers>, posted on Feb. 17, 2010, 4 pages.*

European Search Report dated May 27, 2015 issued in counterpart application No. 12811538.3-1507.

DeAgostini, Windows Class, Day Class Easy PC, 2nd Edition, No. 14, Jun. 23, 1998, 9 pages.

Chinese Office Action dated May 30, 2016 issued in counterpart application No. 201280034654.5, 27 pages.

European Search Report dated Jun. 10, 2016 issued in counterpart application No. 12811538.3-1507, 10 pages.

Japanese Office Action dated May 30, 2016 issued in counterpart application No. 2014-520122, 6 pages.

Russian Office Action dated Feb. 21, 2017 issued in counterpart application No. 2014100873/08, 16 pages.

* cited by examiner

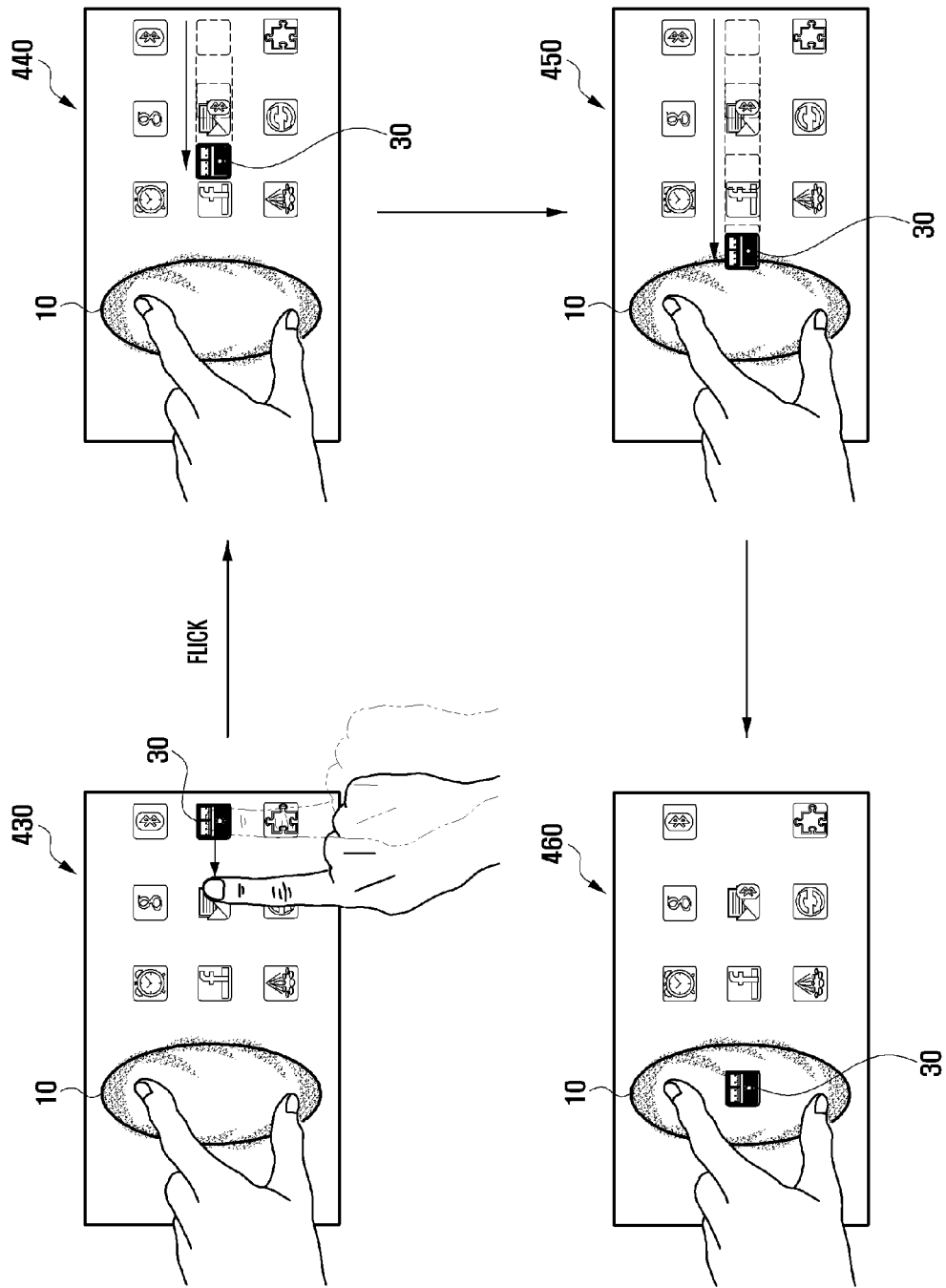

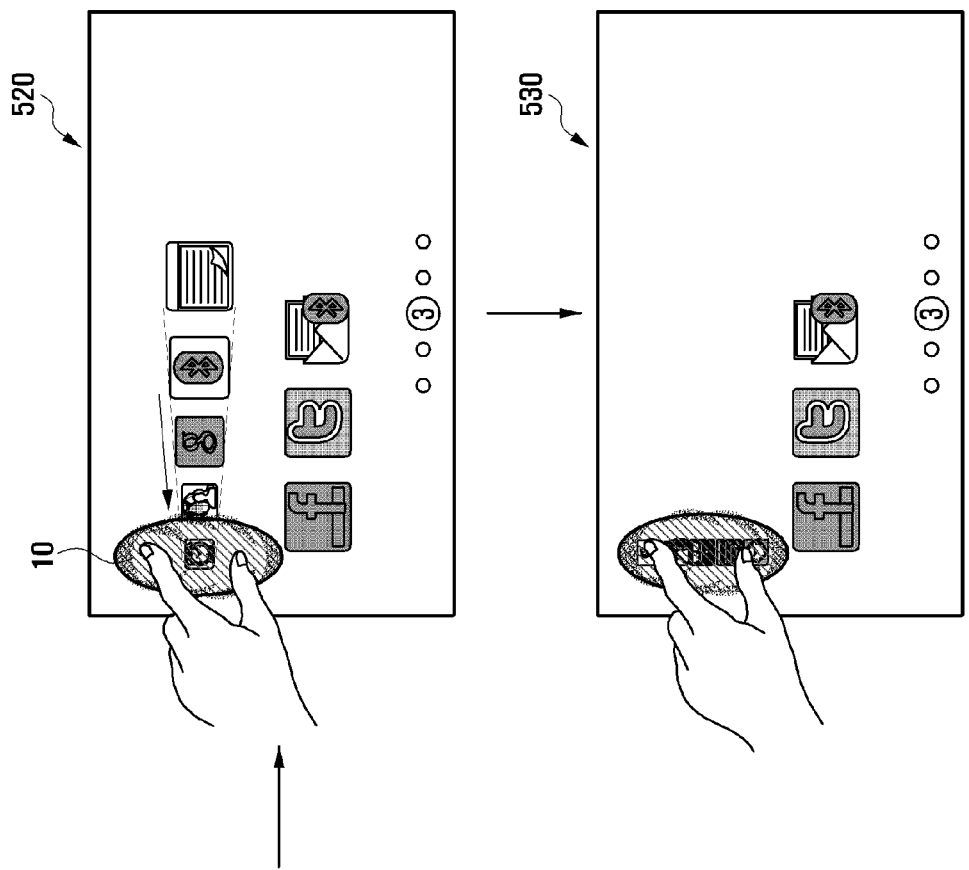
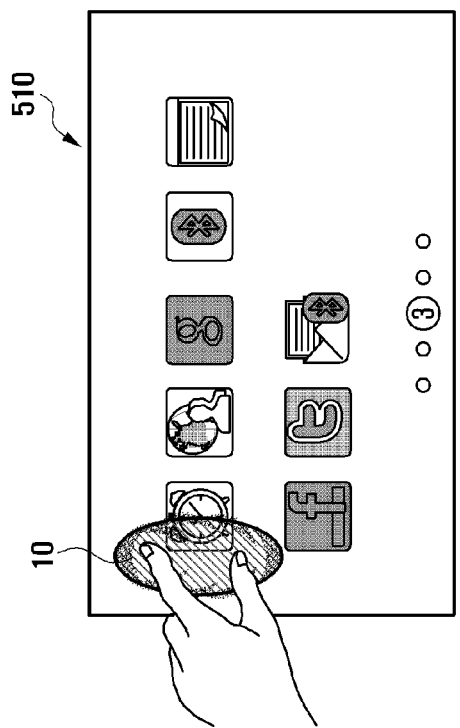
FIG. 5

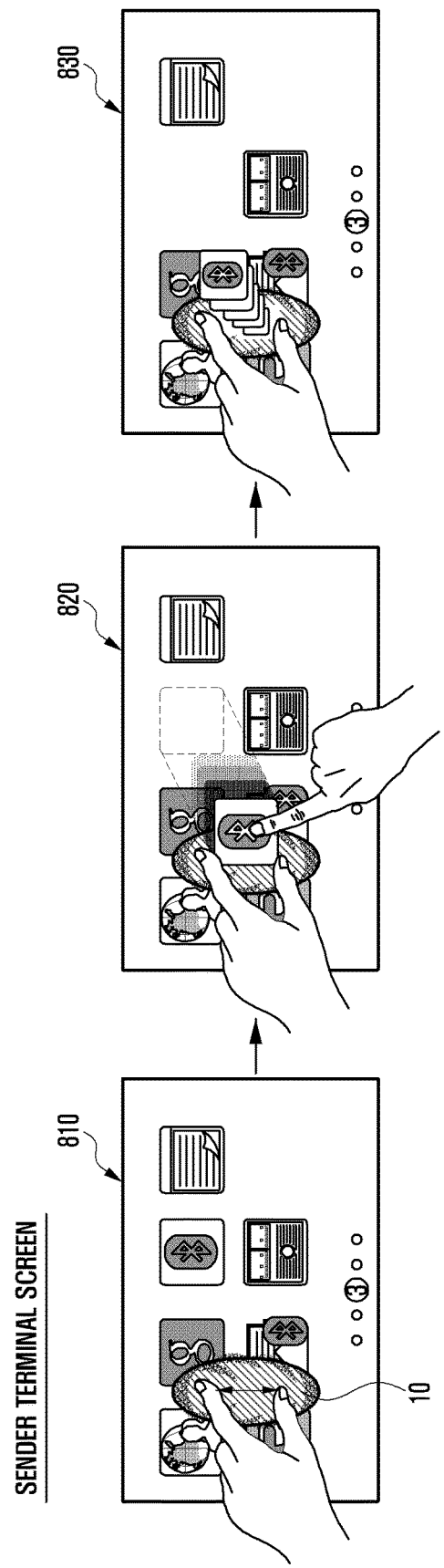

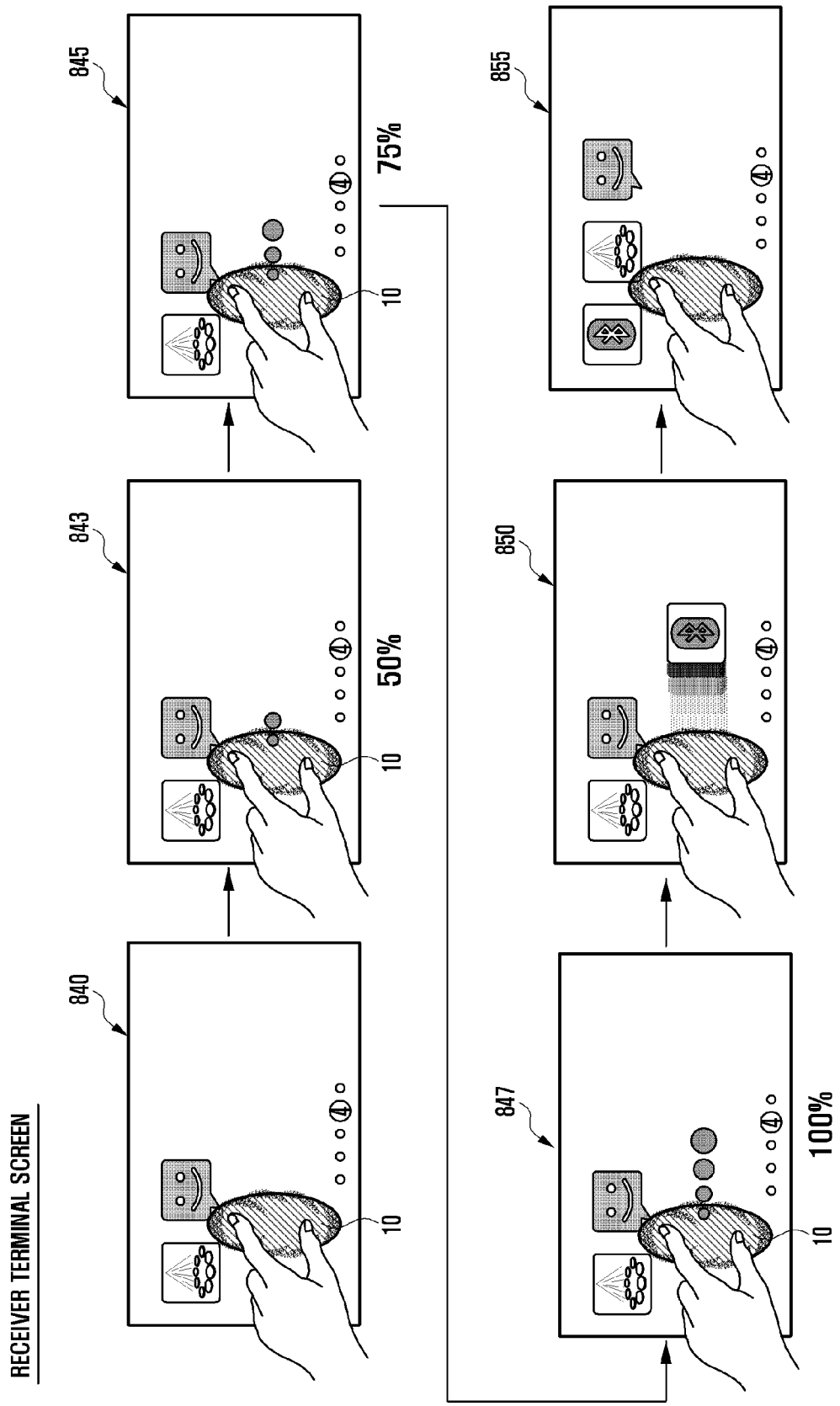

… (1)

METHOD AND APPARATUS FOR CONTROLLING CONTENT USING GRAPHICAL OBJECT

PRIORITY

This application claims priority under 35 U.S.C. §119(a) to Korean Patent Application Serial Nos. 10-2011-0068378 and 10-2011-0127279, which were filed in the Korean Intellectual Property Office on Jul. 11, 2011 and Nov. 30, 2011, respectively, the entire disclosures of which are incorporated herein by reference.

BACKGROUND OF THE INVENTION

1. Field of the Invention

The present invention relates generally to a method and apparatus for controlling content and more particularly, to a content control method and apparatus based on a graphical object wherein the user may create a graphical object on the screen through touch input and easily apply various actions such as copy, delete, move, transfer, attribute change and compress to content items by the created graphical object.

2. Description of the Related Art

Advances in communication and semiconductor technologies have enabled popularization of mobile terminals. With widespread utilization, mobile terminals have become a necessity of modern life. In addition to regular communication functions for voice calls and messages, advanced mobile terminals also support various mobile television functions such as Digital Multimedia Broadcasting (DMB) or Digital Video Broadcasting (DVB), music playback based on the MPEG Audio Layer-3 (MP3) format, camera, data communication, Internet access, and wireless short-range communication. As mobile terminals support many different functions, it is increasingly necessary to develop a method that enables users to control the mobile terminals in a quick and convenient manner. Particularly in recent years, as the number of mobile terminals having a touchscreen increases, a method that enables users to control mobile terminals by touch inputs in a more convenient and intuitive manner is needed.

SUMMARY OF THE INVENTION

The present invention has been made in view of the above problems and the present invention provides a content control method and apparatus based on a graphical object that enable the user to control a mobile terminal through touch inputs in a more convenient and intuitive manner.

According to an aspect of the present invention, there is also provided a content control method and apparatus based on a graphical object wherein the user may create a graphical object on the screen through touch inputs and easily control content items using the graphical object without separate key or menu command.

According to an aspect of the present invention, there is further provided a content control method and apparatus that enable the user to easily activate content command functions of a mobile terminal such as copy, deletion, movement, transfer, attribute change and compression of content items, and viewing content items in another mobile terminal by means of a graphical object.

According to an embodiment of the present invention, there is provided a method for content control, based on a graphical object in a terminal, including detecting a preset touch input, creating a graphical object at a region where the touch input is detected, determining a mode of the created graphical object, linking at least one content item on the screen with the graphical object, and controlling the content item linked therewith depending on the mode of the graphical object.

According to another embodiment of the present invention, there is provided an apparatus for content control based on a graphical object in a terminal, including a touchscreen detecting a preset touch input, and displaying a graphical object at a region where the touch input is detected, and a control unit creating the graphical object, determining a mode of the graphical object, and controlling, when at least one content item on the screen is linked with the graphical object, the content item depending on the mode of the graphical object.

According to yet another embodiment of the present invention, there is provided an apparatus for content control based on a graphical object in a terminal, including an input unit having an external key to generate a preset key signal and a control unit creating a graphical object at a preset region of the screen when the key input signal from the external key is detected, determining a mode of the created graphical object, and when at least a content item on the screen is linked with the graphical object, controlling the linked content item depending on the mode of the graphical object.

According to still another embodiment of the present invention, there is provided a method for content control based on a graphical object in a terminal, comprising detecting a key input from a preset external key, creating a graphical object at a preset region of the screen when the key input from the external key is detected, determining a mode of the created graphical object, linking a content item on the screen with the graphical object and controlling the linked content item depending on the mode of the graphical object.

BRIEF DESCRIPTION OF THE DRAWINGS

The above and other aspects, features and advantages of the present invention will be more apparent from the following detailed description taken in conjunction with the accompanying drawings, in which:

FIGS. 4A to 5 are diagrams illustrating screen representations of linking between a graphical object and content items, according to an embodiment of the present invention;

FIGS. 8B and 8C are diagrams illustrating screen representations for transmission of a content item to another mobile terminal using a graphical object, according to an embodiment of the present invention;

DETAILED DESCRIPTION OF EMBODIMENTS OF THE PRESENT INVENTION

Hereinafter, various embodiments of the present invention are described as follows with reference to the accompanying drawings. The same reference symbols are used throughout the drawings to refer to the same or like parts. Detailed descriptions of well-known functions and structures may be omitted to avoid obscuring the subject matter of the present invention.

In the following description, the term "mobile terminal" is a device which includes a touchscreen, such as a Personal Digital Assistant (PDA), a mobile communication terminal, a smart phone, a tablet computer, a laptop computer, a netbook, a Large Format Display (LFD), an interactive whiteboard, a touch monitor, or a tabletop computer.

A "content item" indicates an independent entity (such as a file, icon or thumbnail image), an aggregate entity (such as a folder or file group), or unstructured data (such as text, pictures or figures in a document).

A "graphical object" associates a content item on the screen with a special region, and is displayed on the screen in response to a preset touch input. The special region is a storage region of the mobile terminal, another mobile terminal or a server. The special region may also be a functional region of the mobile terminal. In the functional region, the user performs various commands such as copy, move, delete, uninstall, transfer to another mobile terminal or a server, change attribute, compress, and view a content item in another mobile terminal. A graphical object is composed of a static image or a dynamic image, and may change its size according to a user gesture such as stretch or pinch.

Figure 1:
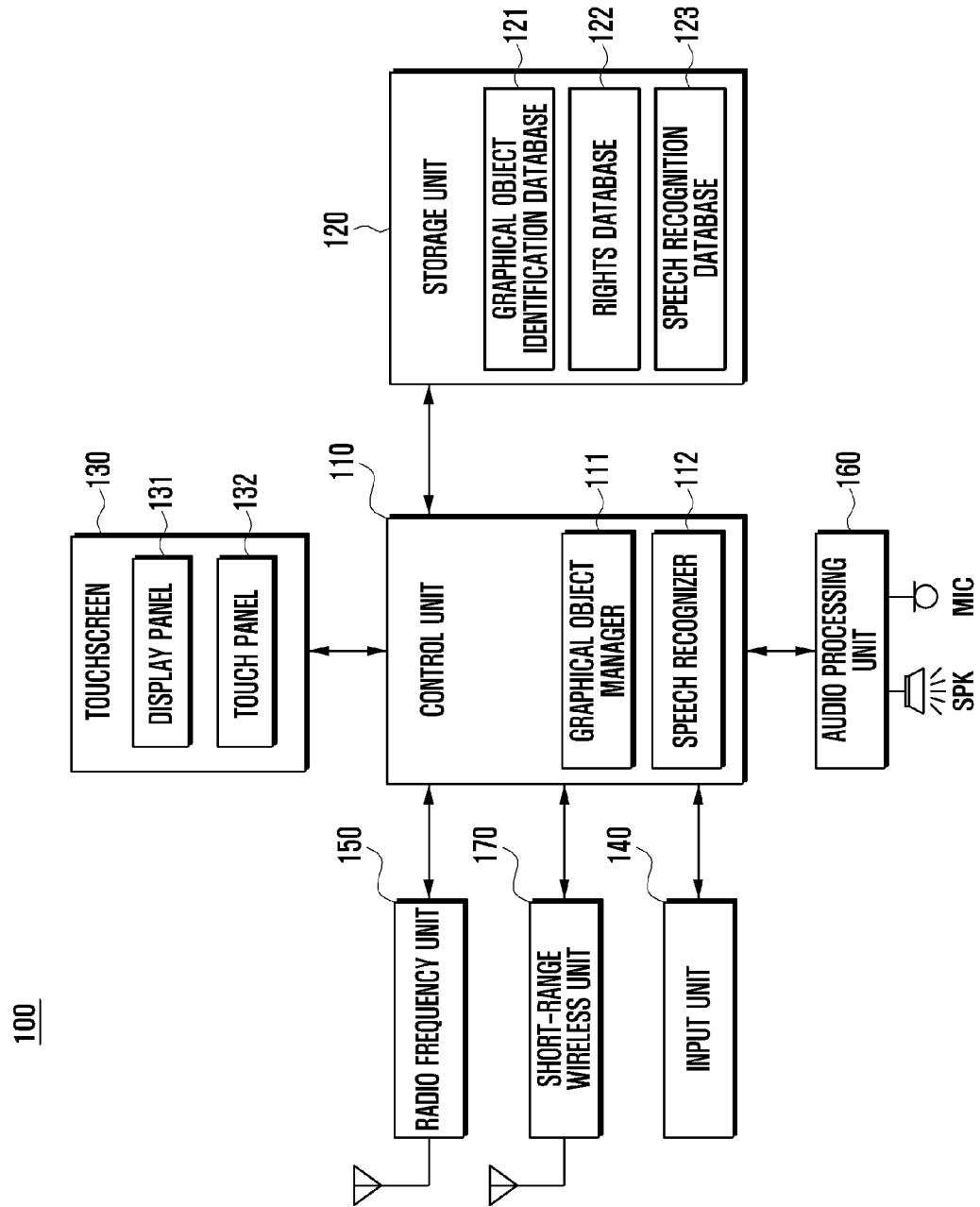
FIG. 1 is a block diagram of a mobile terminal according to an embodiment of the present invention.

FIG. 1 is a block diagram of a mobile terminal 100 according to an embodiment of the present invention.

Referring to FIG. 1, the mobile terminal 100 includes a short-range wireless unit 170, an audio processing unit 160, a radio frequency unit 150, an input unit 140, a touchscreen 130, a storage unit 120 and a control unit 110. The touchscreen 130 includes a display panel 131 and a touch panel 132. The control unit 110 includes a graphical object manager 111 and a speech recognizer 112. The storage unit 120 includes a graphical object identification database 121, a rights database 122, and a speech recognition database 123.

The short-range wireless unit 170 establishes a communication channel with a second mobile terminal in the vicinity under control of the control unit 110. Upon activation of a content transfer function through a graphical object, the short-range wireless unit 170 establishes a short-range communication channel with a second mobile terminal, and send or receive a content item to or from the second mobile terminal through the short-range communication channel. Here, the short-range wireless unit 170 performs communication based on Bluetooth®, InfraRed, Wi-Fi, Wi-Fi Peer to Peer, Wi-Fi Direct or ZigBee. After establishment of the short-range communication channel, in a mode for viewing a content item in the second mobile terminal, the short-range wireless unit 170 sends authentication information for verifying a right to view to the second mobile terminal and receive authentication results therefrom.

The audio processing unit 160 performs encoding and decoding of an audio signal, and includes a codec (coder/decoder) and an audio amplifier. The audio processing unit 160 is connected to a Microphone (MIC) and a Speaker (SPK). The audio processing unit 160 converts an analog voice signal from the microphone into digital data and forward the digital data to the control unit 110, and converts digital data from the control unit 110 into an analog voice signal and output the analog voice signal to the speaker. The audio processing unit 160 outputs various audio signals generated by the mobile terminal 100 (for example, audio signals generated by playback of MP3 files and moving image files) to the speaker. The audio processing unit 160 converts a voice signal from the microphone into digital data and forward the digital data to the speech recognizer 112 of the control unit 110.

The radio frequency unit 150 establishes a communication channel with a base station for a voice call, a data call and a video call. Accordingly, the radio frequency unit 150 includes a radio frequency transmitter (not shown) for up-converting the frequency of a signal to be transmitted and amplifying the signal, a radio frequency receiver (not shown) for low-noise amplifying a received signal and down-converting the frequency of the received signal, and a duplexer (not shown) for separating a transmit signal from a receive signal. When a graphical object is operated in a server transfer mode, the radio frequency unit 150 establishes a communication channel with a server and sends a content item to the server through the communication channel.

The touchscreen 130 performs an input function and a display function. Accordingly, the touchscreen 130 includes a display panel 131 and a touch panel 132.

The display panel 131 displays various menus of the mobile terminal 100, information input by the user, and information to be provided to the user. For example, the display panel 131 displays various screens in the course of utilizing the mobile terminal 100, such as a home screen having multiple pages, a message composition screen and a call-handling screen. The display panel 131 provides various screens for controlling content items using a virtual region. The various screens are described below with reference to the drawings. The display panel 131 is implemented using Liquid Crystal Display (LCD) devices, Organic Light Emitting Diodes (OLED), or Active Matrix Organic Light Emitting Diodes (AMOLED).

The touch panel 132 is positioned to cover the display panel 131, and generates a touch event in response to a touch gesture of the user with the finger or a stylus and sends the touch event to the control unit 110. The touch panel 132 detects a touch event through a physical change such as a change in capacitance or resistance) caused by surface contact with an object, and send information on the type of the touch input (touch, touch release, tap, double touch, touch movement such as drag or flick, multitouch or the like) and the touch coordinates to the control unit 110. The touch panel 132 may generate a touch input signal for creating, deleting, moving, or changing mode of a graphical object, and send the touch input signal to the control unit 110.

The input unit 140 may include a plurality of alphanumeric and function keys for inputting alphanumeric information and for setting various functions of the mobile terminal 100. The input unit 140 generates an external key signal for creating, deleting or changing modes of a graphical object and sends the key signal to the control unit 110. The input unit 140 is implemented using at least one of a keypad of buttons, a trackball joystick, an optical joystick, a wheel key, a touch key, a touch pad, a touchscreen and a combination thereof.

The storage unit 120 stores programs and user data for performing functions of the mobile terminal 100. For example, the storage unit 120 may store an Operating System (OS) for booting and operating the mobile terminal 100, other application programs related to images, sounds and short-range wireless communication to support optional functions of the mobile terminal 100, and various content items. The storage unit 120 may store key maps and menu maps for proper display operation. The key maps correspond to various keyboard layouts including 3 by 4 keypad and QWERTY layouts, and may include a control key map for controlling execution of an active application program. The menu maps may include a menu map for controlling execution of an active application. The storage unit 120 may store a content control program that enables control of content items through a graphical object by means of commands or modes such as move, copy, delete, uninstall, transfer, change attribute, compress, and view and import from another mobile terminal. Control of content items is described below. The storage unit 120 may store mode information on mappings between modes of the graphical object and applications. That is, when a graphical object is created, the mode of the graphical object is determined depending on an application being executed. If no mapping information is given, the storage unit 120 may store information on a default mode for a graphical object. If a graphical object is transitioned to a server transfer mode, the storage unit 120 may store information on a server to be accessed, such as IP address, URL address, user ID, password and port number. In addition, the storage unit 120 may include a storage region allocated to a graphical object. When the graphical object is in a copy or move mode, the storage region is used as an area temporarily storing content items. The storage unit 120 may include a graphical object identification database 121, a rights database 122, and a speech recognition database 123.

The graphical object identification database 121 stores, when the mobile terminal 100 is connectable with multiple other mobile terminals, information on mappings between graphical objects and other mobile terminals. The graphical object identification database 121 is used to help the user easily recognize a different mobile terminal being connected, as described below.

The rights database 122 stores information on other mobile terminals. Terminal information stored in the rights database 122 is used to authenticate another mobile terminal that attempts to view a content item stored in the mobile terminal 100. Different rights are assigned to different other mobile terminals. For example, the rights database 122 may store rights information that allows a first mobile terminal to view all the content items stored in the mobile terminal 100, and allows a second mobile terminal to view only content items set to be shared, among all the content items stored in the mobile terminal 100.

The speech recognition database 123 stores information for speech recognition, such as information on mappings between voice frequency waveforms and phonemes, syllables or words. Speech recognition may include identifying a voice frequency waveform and finding words matching the identified voice frequency waveform. More specifically, speech recognition may include a series of analysis and synthesis steps involving voice sounds, phonemes, words, sentences and semantics. Speech recognition technology is well known to those skilled in the art, and the speech recognition database 123 is not described further.

The control unit 110 controls the overall operation of the mobile terminal 100 and control signal exchange between internal components thereof. The control unit 110 may create a graphical object in response to a preset touch input or preset external key signal, and control performance of various operations on content items such as copy, move, delete, uninstall, transfer, change attribute or compress. Accordingly, the control unit 110 may include a graphical object manager 111 and a speech recognizer 112.

The graphical object manager 111 creates a graphical object and displays the same at a portion of the display panel 131 or remove the graphical object from the display panel 131 in response to a touch input from the touch panel 132. The graphical object manager 111 may also create a graphical object and display the same at a portion of the display panel 131 or remove the graphical object from the display panel 131 in response to a key signal from the input unit 140.

After display of the graphical object on the display panel 131, the graphical object manager 111 determines the mode of the graphical object. Here, the mode of the graphical object is set to a preset default mode or be determined depending on an active application being executed. Accordingly, the graphical object manager 111 may refer to mode mapping information stored in the storage unit 120 or communication state of the mobile terminal 100. For example, when the mobile terminal 100 is connected with another mobile terminal through wireless short-range communication, the mode of the graphical object is set to a terminal transfer mode. When the mobile terminal 100 is connected with a preset server through wireless communication, the mode of the graphical object is set to a server transfer mode. When the mobile terminal 100 is not connected with any external device, the mode of the graphical object is set to a default mode. The graphical object manager 111 outputs a mode selection list when the graphical object is displayed, and set the mode of the graphical object to a mode selected from the mode selection list. Here, the mode of the graphical object includes one of a copy mode, a move mode, a delete mode, an uninstall mode, a change attribute mode, a compress mode, a terminal transfer mode, a server transfer mode, and a content view mode between terminals.

After mode determination, the graphical object manager 111 checks linking between a content item and the graphical object. When the graphical object is linked with a content item, the graphical object manager 111 controls the content item according to the determined mode of the graphical object. Control of a content item is described in detail below.

In the copy or move mode, the graphical object manager 111 temporarily stores a content item to be copied or moved in a storage region allocated to the graphical object. On the graphical object, the graphical object manager 111 displays images or icons representing content items stored in the storage region. For example, the graphical object manager 111 displays images or icons representing stored content items so that they overlap each other or do not overlap each other. Then, the user may select one of the content items stored in the storage region through toggling, scrolling or page transitioning, and move the selected content item to the screen. The graphical object manager 111 may change the mode of the graphical object to another mode in response to an occurrence of a touch event on the graphical object. For example, when a touch signal is generated at a region of the graphical object in a state in which the graphical object is in the copy mode, the graphical object manager 111 may change the mode of the graphical object. Alternatively, when a touch event occurs in the graphical object, the graphical object manager 111 may change the mode of the graphical object. For example, when a touch and move event is generated in a left or right direction on the graphical object region in a state in which the graphical object is in the copy mode, the graphical object manager 111 may change the mode of the graphical object in sequence according to a preset rule. Here, the graphical object manager 111 may change at least one of the color and shape of the graphical object according to the mode thereof. This may help the user readily recognize the mode of the graphical object.

The graphical object manager 111 sends a selected content item to another mobile terminal or a server. For example, when a graphical object is created, the graphical object manager 111 may check whether an external mobile terminal is present in the vicinity. When an external mobile terminal is present in the vicinity thereof, the graphical object manager 111 may establish a wireless short-range communication channel with the external mobile terminal and send a content item through the wireless short-range communication channel. In the case that multiple external mobile terminals are present and connectable through wireless short-range communication, the graphical object manager 111 sends a content item to all the external mobile terminals.

Here, before sending a content item, the graphical object manager 111 displays a popup window for requesting the user to select one or more of the external mobile terminals. When the graphical object is in the server transfer mode, the graphical object manager 111 may make a request for establishing a wireless communication channel with a pre-specified server with reference to server information stored in the storage unit 120. When a wireless communication channel is established, the graphical object manager 111 sends a content item to the server according to a user request. Transmission of a content item is described below with reference to FIGS. 8A to 8C.

In the terminal transfer mode, the graphical object manager 111 changes the size, shape, color and brightness of the graphical object according to external receiver mobile terminals to which a content item is to be sent. Accordingly, in the terminal transfer mode, the graphical object manager 111 may change the size, shape, color and brightness of the graphical object according to preset information regarding connected receiver terminals or according to preset touch inputs occurring on the graphical object. The user may recognize a desired receiver terminal depending on the size, shape, color and brightness of the graphical object, and send a content item to the desired receiver terminal. Hence, in the event that multiple receiver terminals are present, the user sends a content item to a desired receiver terminal without selecting a receiver terminal from a list of receiver terminals.

In the content view mode, the graphical object manager 111 sends authentication information to an external mobile terminal having a desired content item. When authentication is not required, the graphical object manager 111 need not send authentication information. In reverse, when a content view request is made by an external mobile terminal, the graphical object manager 111 may perform authentication by comparing received authentication information with the rights database 122 and send the authentication result to the external mobile terminal.

The speech recognizer 112 recognizes a voice signal from the audio processing unit 160. In the terminal transfer mode, the speech recognizer 112 may recognize a voice signal from the user to extract receiver terminal information. Here, the control unit 110 may determine a receiver terminal to which a content item is to be sent by comparing the output from the speech recognizer 112 with the speech recognition database 123.

When a voice signal requesting graphical object creation is input, the graphical object manager 111 creates a graphical object at a portion of the touchscreen 130. When a voice signal requesting graphical object creation is input after occurrence of a touch on the touchscreen 130, the graphical object manager 111 may create a graphical object at the touched location. In the above description, a content item is sent through a wireless short-range communication channel or mobile communication channel. However, when the mobile terminal 100 is connected to an external mobile terminal or a server through a cable, a content item may also be sent through a wired communication channel.

Although not illustrated in FIG. 1, the mobile terminal 100 may further include at least one of a camera module for capturing still or moving images, a digital broadcast receiving module for receiving digital broadcasts, a digital music player like an MP3 module and a proximity sensor module for proximity sensing.

Figure 2:
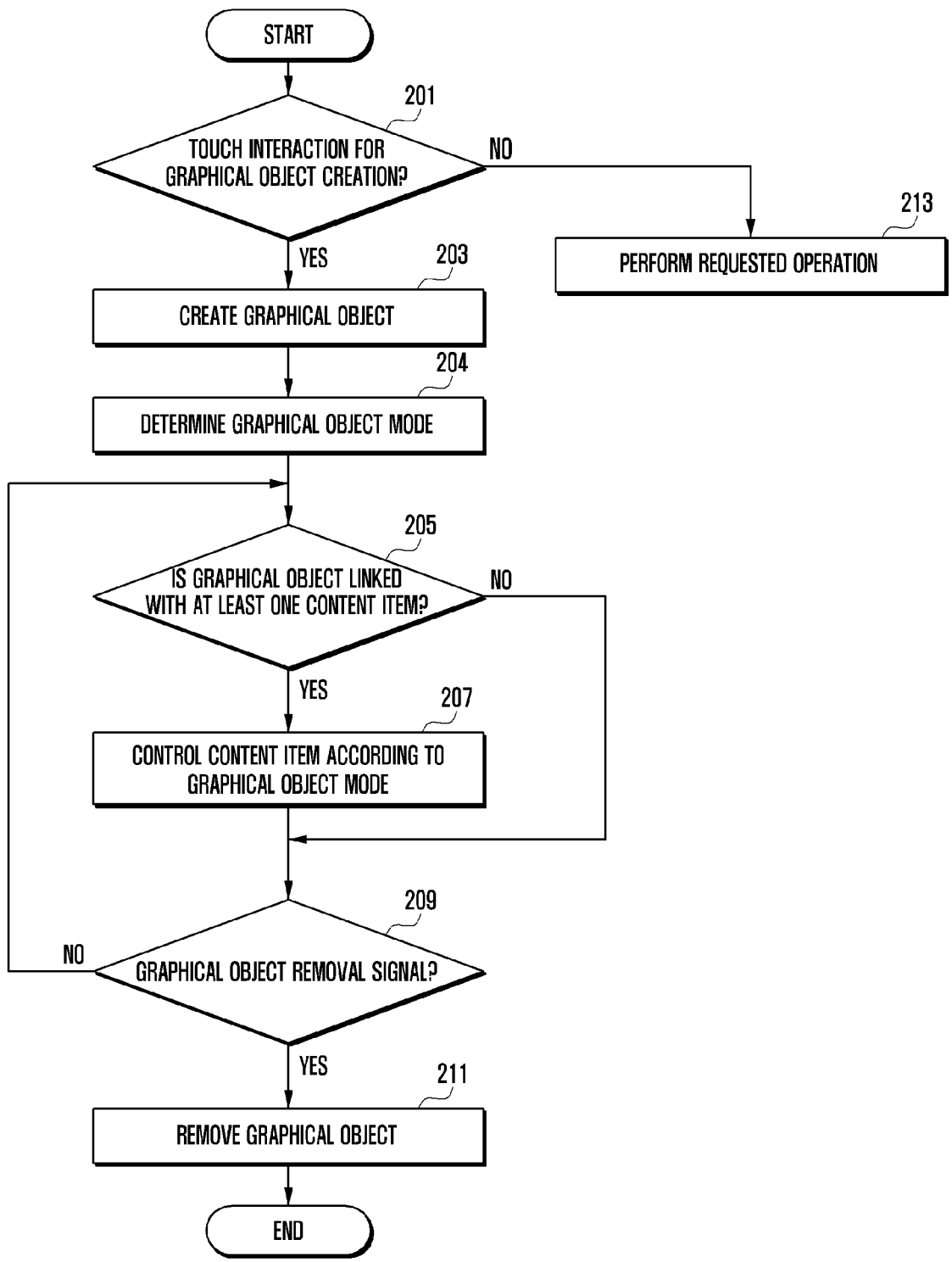
FIG. 2 is a flowchart of a content control method based on a graphical object according to an embodiment of the present invention.

FIG. 2 is a flowchart of a content control method based on a graphical object according to an embodiment of the present invention. FIGS. 3A to 3D are diagrams of screen representations illustrating creation of a graphical object.

Referring to FIG. 2, the control unit 110 of the mobile terminal 100 checks whether a touch input requesting graphical object creation is detected at a region of the touchscreen 130 in Step 201. Here, the touch input includes a long touch input, a double touch input, or a multitouch input. For example, when the user makes a long touch gesture or a double touch gesture on a region of the screen, the control unit 110 may recognize the touch gesture as a request for graphical object creation. When a multitouch input corresponding to a multitouch pinch gesture (reducing distance between touch points) or a multitouch stretch gesture (increasing distance between touch points) is detected, the control unit 110 may recognize the multitouch input as a request for graphical object creation. The graphical object creation request may be made in other ways. For example, a separate external key is used to create a graphical object. An existing function key mapped with a specific function may also be used to create a graphical object. For example, the control unit 110 may perform a menu related function when a menu key is pressed for, for example, less than one second, and may create a graphical object when the menu key is pressed for one second or more. Here, the graphical object is created at a preset region of the touchscreen 130 and be moved to another region in response to a touch input such as drag from the user. The external key includes a button key or a touch key. Use of such an external key for graphical object creation is more convenient for a user carrying a mobile terminal with a small screen size.

When a touch input requesting graphical object creation is not detected, the control unit 110 performs a requested operation in Step 213. For example, the control unit 110 may continue to display the idle screen, perform music playback, take a picture, or perform call handling according to a user request. When a touch input requesting graphical object creation is detected, the control unit 110 creates a graphical object and displays the graphical object at a portion of the touchscreen 130 in Step 203. For example, referring to FIG. 3A, when the user makes multitouch and stretch gestures on the touchscreen 130 as illustrated in screen 301 and screen 302, the control unit 110 may create a graphical object 10 and display the same at the touched location. The graphical object 10 is changed in size in response to a pinch or stretch gesture. For example, when the user makes a pinch gesture on the graphical object 10 as illustrated in screen 303, the graphical object 10 is reduced as illustrated in screen 304. When the user makes a stretch gesture on the graphical object 10, the graphical object 10 is enlarged. The graphical object 10 may take the form of a static image or of a dynamic image with animated effects.

Figure 3A:
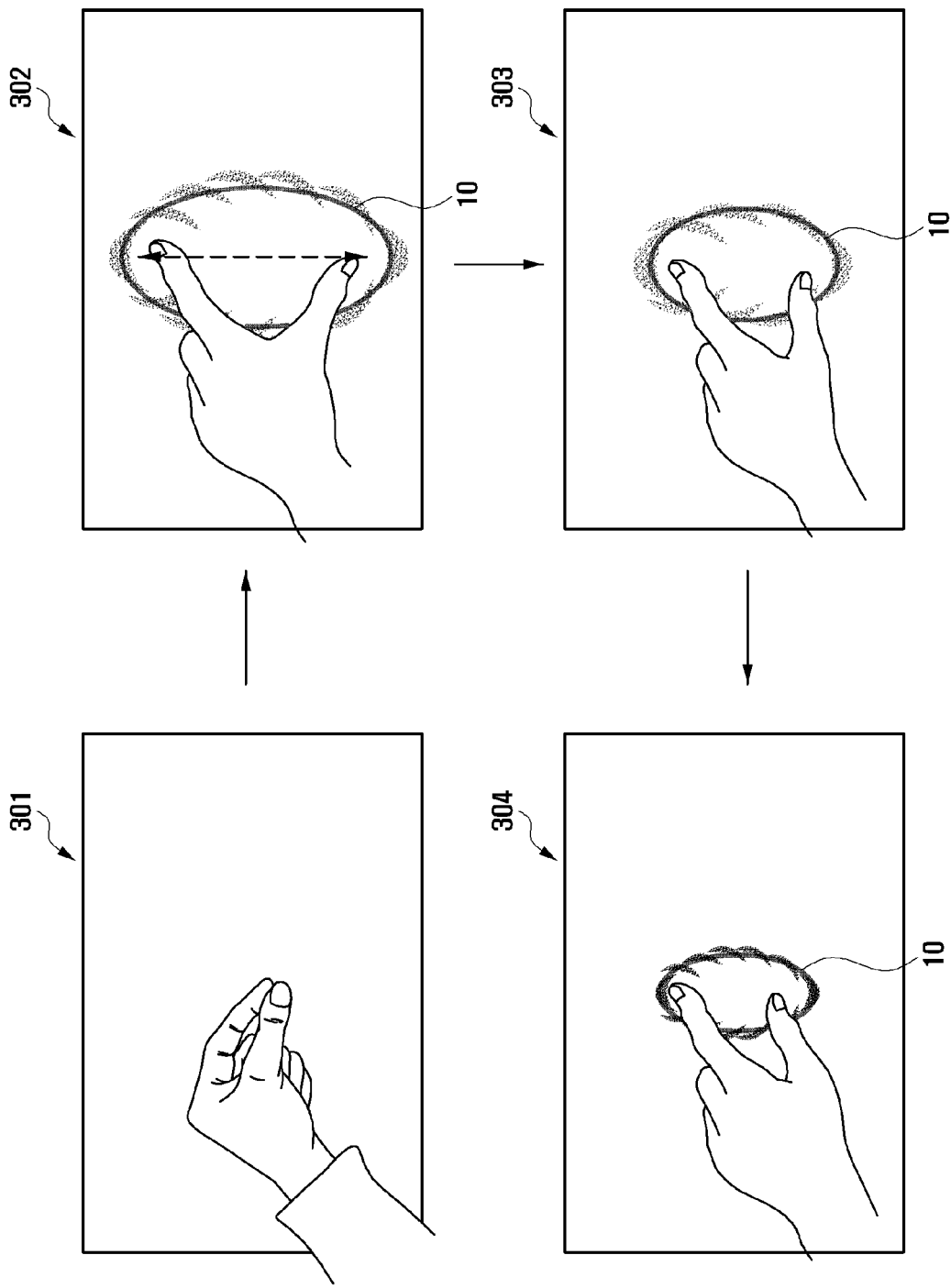
FIGS. 3A to 3D are diagrams illustrating screen representations for creation of a graphical object, according to an embodiment of the present invention.
Figure 3B:
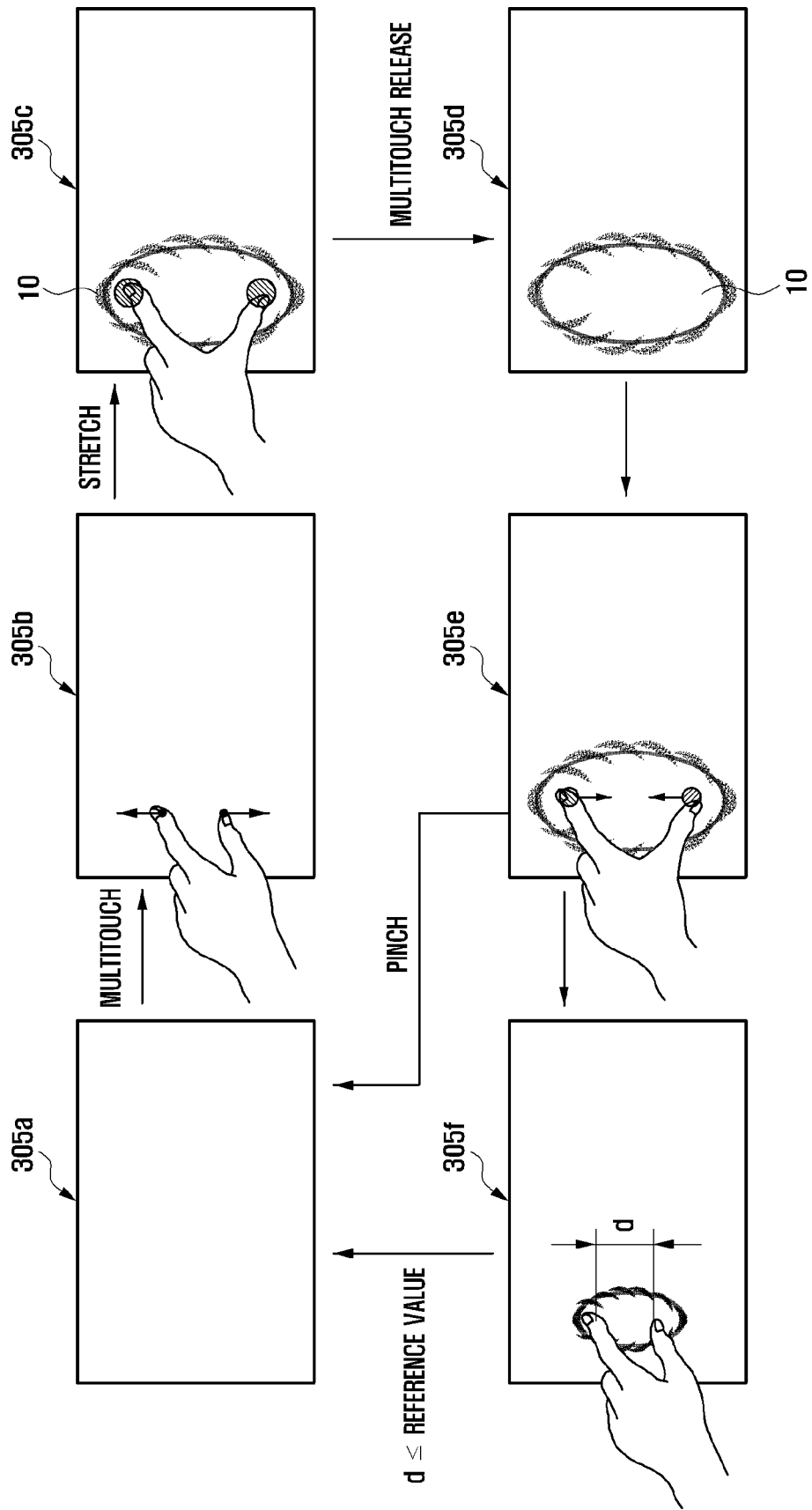

Referring to FIG. 3B, when the user makes a multitouch gesture on the touchscreen 130 as illustrated in screen 305a and makes a stretch gesture as illustrated in screen 305b, the control unit 110 creates and displays a graphical object 10 as illustrated in screen 305c. When the touch is released, the control unit 110 may continue to display the graphical object 10 as illustrated in screen 305d. Thereafter, when the user makes a multitouch gesture on the graphical object 10 as illustrated in screen 305d and makes a pinch gesture as illustrated in screen 305e, the control unit 110 may remove the graphical object 10. Alternatively, when the distance between touch points of a pinch gesture made on the graphical object 10 is less than a threshold value (d) as illustrated in screen 305f, the control unit 110 may remove the graphical object 10.

Figure 3C:
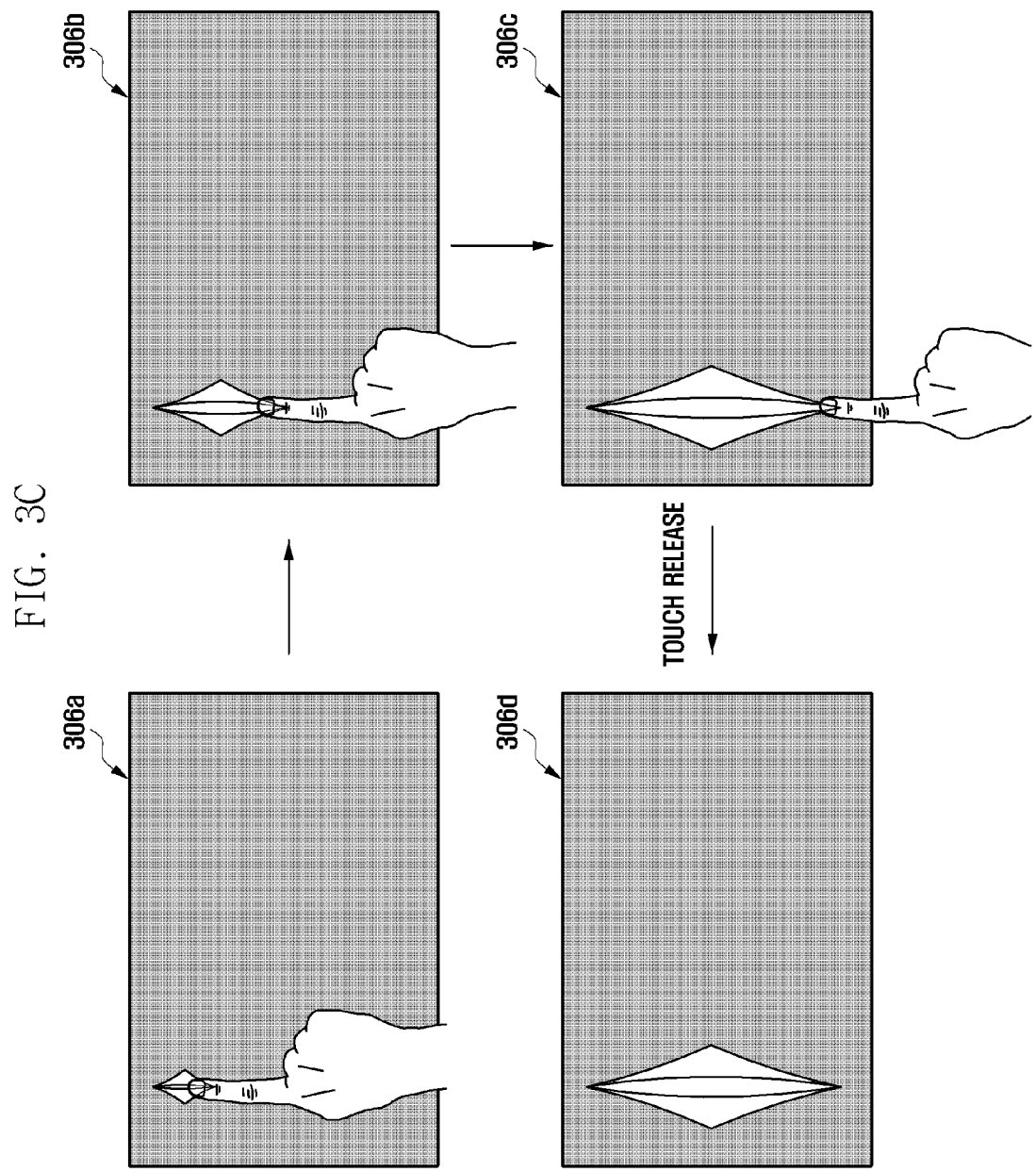
Figure 3D:
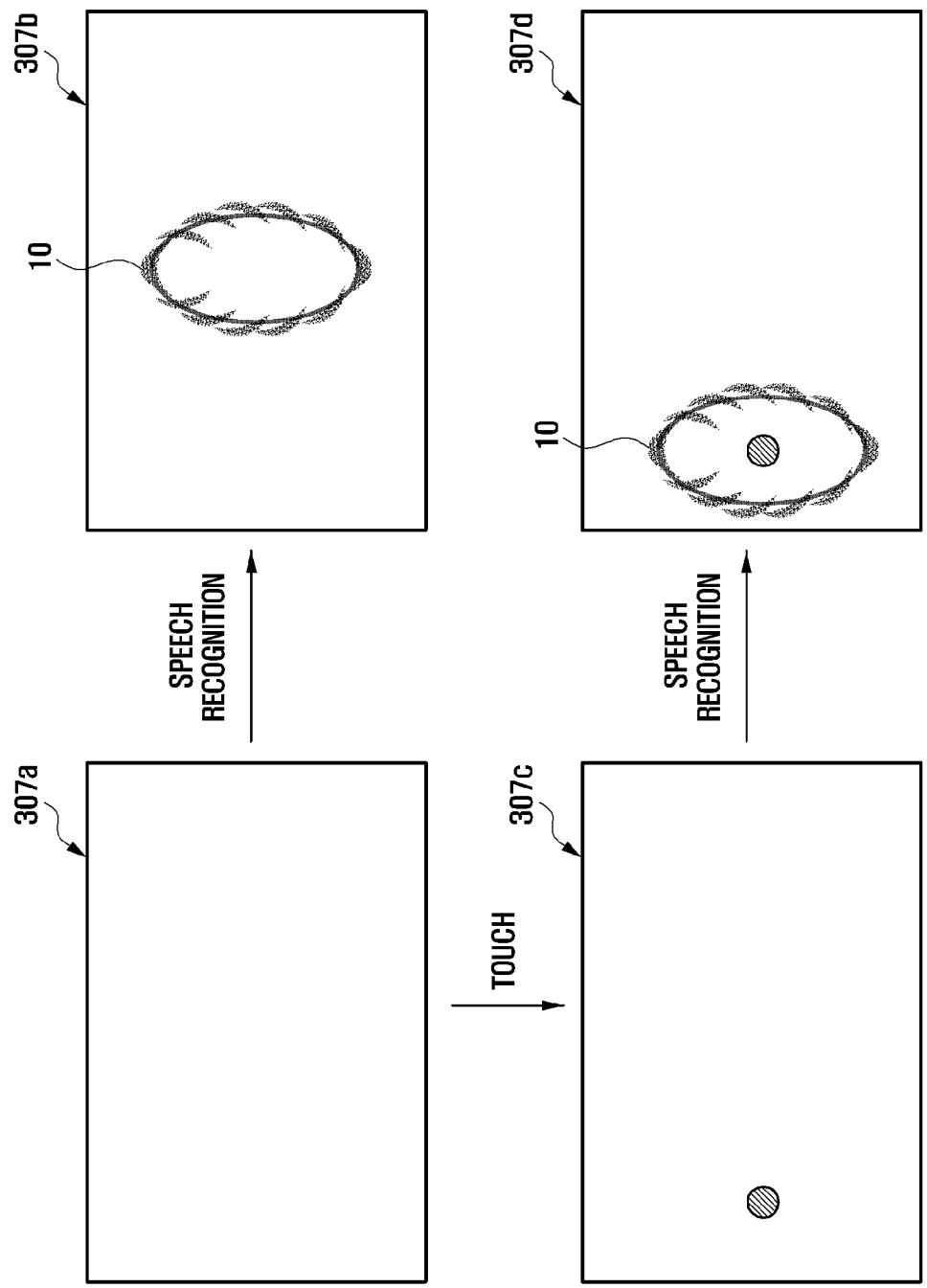

Referring to FIG. 3C, when the user makes a touch gesture on the touchscreen 130 as illustrated in screen 306a and makes a swipe gesture as illustrated in screens 306b and 306c, the control unit 110 draws a figure in the swipe direction through visual effects on the screen. The figure is regarded as a graphical object 10. When touch is released, the control unit 110 may continue to display the figure as illustrated in screen 306d. When another swipe gesture is made, the control unit 110 may remove the figure and restore the original screen. In this embodiment, it is necessary to distinguish a swipe gesture from a touch-move gesture such as a drag or flick. For example, when a touch-move gesture is detected at a preset level of pressure or higher on the touchscreen 130, the control unit 110 may recognize a swipe gesture for graphical object creation. Or, when a touch is sustained for a preset time or more and the touch is moved on the touchscreen 130, the control unit 110 may recognize a swipe gesture for graphical object creation.

A graphical object is created using speech recognition. Specifically, referring to FIG. 3D, when a preset voice signal requesting graphical object creation is input as illustrated in screen 307a in a state in which the speech recognition function is activated, the control unit 110 may create and display a graphical object 10 as illustrated in screen 307b. Alternatively, after a touch is input on a portion of the touchscreen 130 as illustrated in screen 307c, when a preset voice signal requesting graphical object creation is input, the control unit 110 may create a graphical object 10 and display the same around the touched location as illustrated in screen 307d.

After creation of the graphical object 10 through one of the various ways described above, the control unit 110 determines the mode of the graphical object in Step 204. Modes of the graphical object correspond to functions of the mobile terminal 100. The mode of a graphical object includes one of a copy mode, move mode, delete mode, uninstall mode, change attribute mode, compress mode, terminal transfer mode and server transfer mode. Here, the control unit 110 may set the mode of the graphical object to a preset default mode or determine the mode depending on an active application being executed. Accordingly, the storage unit 120 may store mode information on mappings between graphical object modes and applications. In a case in which no mapping information is given, the storage unit 120 may store information on a default mode for a graphical object. The mode of a graphical object is determined according to communication states of the mobile terminal 100. For example, when the mobile terminal 100 is connected with another mobile terminal through wireless short-range communication, the mode of the graphical object is set to a terminal transfer mode. When the mobile terminal 100 is connected to a preset server, the mode of the graphical object is set to a server transfer mode. When the mobile terminal 100 is not connected with any external device, the mode of the graphical object is set to a default mode. In addition, the control unit 110 outputs a mode selection list when the graphical object is created, and set the mode of the graphical object to a mode selected from the mode selection list.

After mode determination, the control unit 110 checks whether the graphical object is linked with at least one content item on the screen in Step 205. Linking between the graphical object and a content item is formed in various ways. For example, when a content item on the touchscreen 130 is dragged and dropped on the graphical object, the graphical object can be linked with the content item. When a content item on the touchscreen 130 is moved across the graphical object, the graphical object can be linked with the content item. When the graphical object is moved to a content item to overlap with the content item, the graphical object can be linked with the content item. Here, when overlap between the graphical object and the content item is sustained for a preset time or more, the control unit 110 may link the graphical object with the content item, to link the graphical object only with a desired content item when multiple content items are displayed on the screen. In addition, when a content item is moved close to the graphical object through a touch and flick gesture, the graphical object can be linked with the content item. That is, when a content item is touched, moved at a preset speed or faster toward the graphical object and released near the graphical object, the control unit 110 may recognize a request for linking the graphical object with the content item.

When the graphical object is not linked with a content item, the control unit 110 proceeds to Step 209. When the graphical object is linked with a content item, the control unit 110 controls the content item according to the determined mode of the graphical object in Step 207. For example, the control unit 110 may copy, delete, uninstall, move or compress the content item, transmit the content item to another mobile terminal or to a server, or change attributes of the content item, as described below with reference to FIGS. 4 to 9.

The control unit 110 checks whether a signal for graphical object removal is input in Step 209. A graphical object removal signal is generated when the touch input detected at Step 201 is released. That is, an option is set so that the graphical object is displayed on the touchscreen 130 only when the corresponding touch input is sustained. In the event that an option is set so that the graphical object is continuously displayed on the touchscreen 130 even after the corresponding touch input is released, a graphical object removal signal is generated when the graphical object is touched and moved outside the screen. A graphical object removal signal may also be generated when a menu key or cancel key for graphical object removal is entered.

When a graphical object removal signal is not input, the control unit 110 returns to Step 205 and continues the procedure. When a graphical object removal signal is input, the control unit 110 removes the graphical object from the touchscreen 130 in Step 211.

In the above description, the graphical object is displayed at a location where the corresponding touch input is detected. Alternatively, the control unit 110 displays the graphical object at a location pre-specified by the current mode (for example, type of the current content item or currently activated function).

Figure 4A:
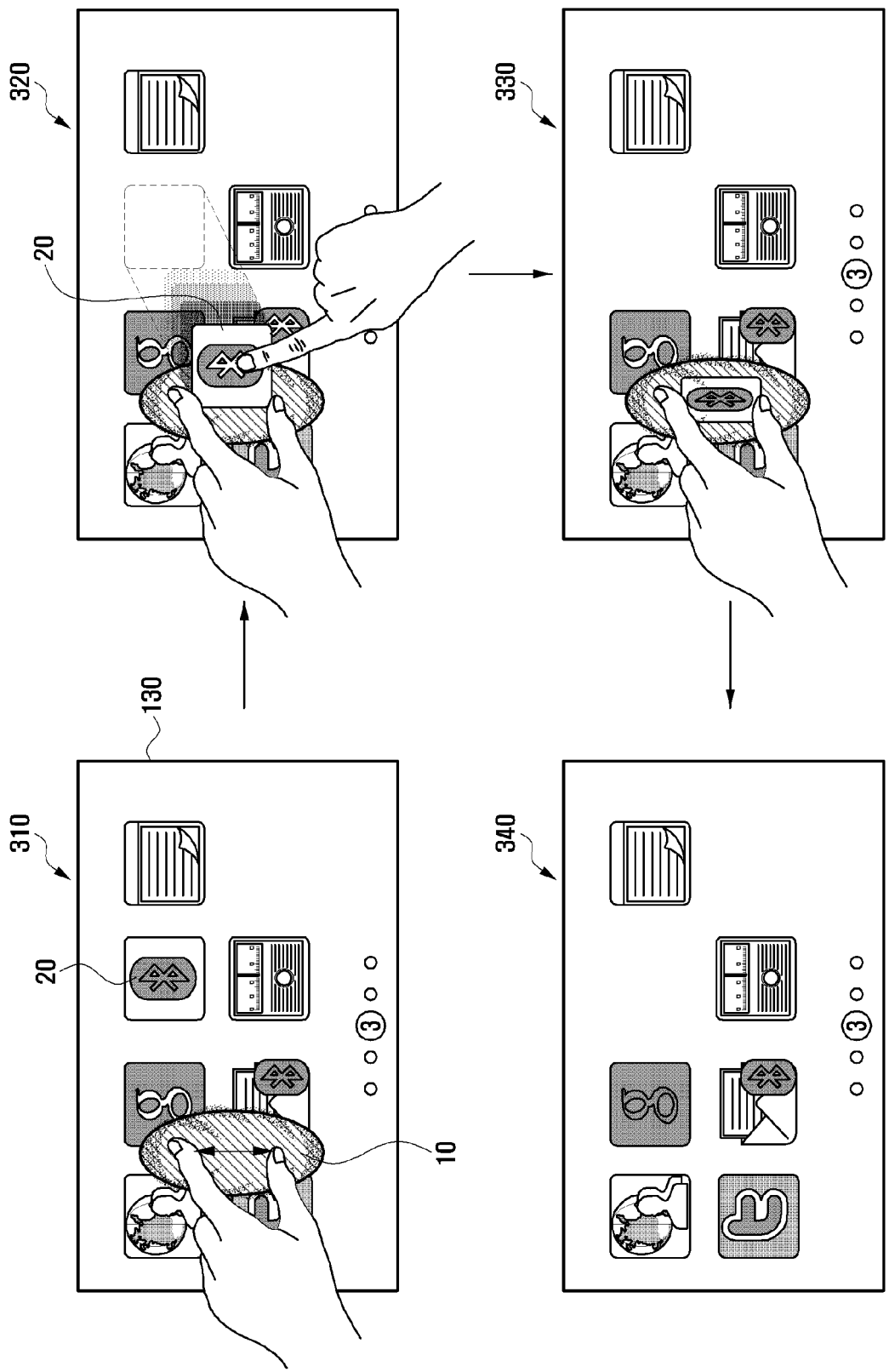
Figure 4B:
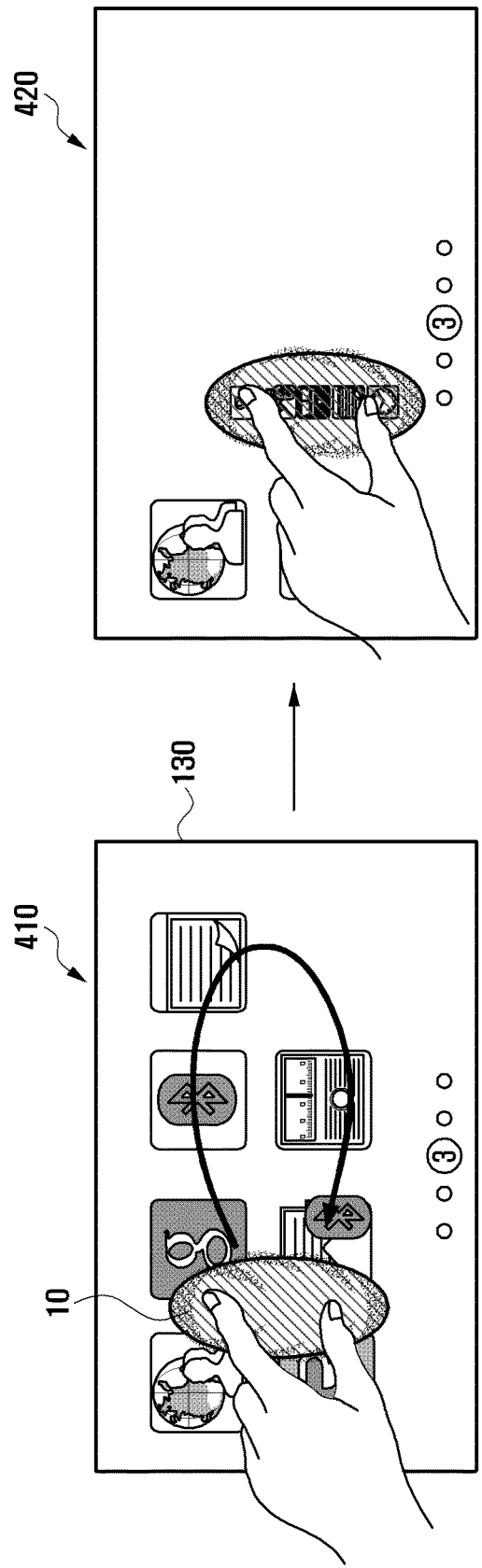

FIGS. 4A to 5 are diagrams of screen representations illustrating linking between a graphical object and content items. In the following description, a graphical object is created in the home screen using a multitouch gesture and the graphical object is assumed to be in the move mode.

Referring to FIG. 4A, the touchscreen 130 outputs a home screen containing multiple content items. Here, the content items may include a shortcut icon, folder icon, menu icon, widget icon, music file and image file. The home screen is composed of multiple pages. For example, as illustrated in screens 310 to 340, the home screen has five pages and the third page is currently output.

When the user makes a multitouch stretch gesture in the home screen, the control unit 110 creates a graphical object 10 on the touchscreen 130 and display the same at the location where the gesture is detected as illustrated in screen 310. In a state in which the graphical object 10 is output as illustrated in screen 310, when the user touches a content item 20 as illustrated in screen 320, moves the content item 20 over the graphical object 10 and releases the content item 20 as illustrated in screen 330, the control unit 110 may link the graphical object 10 with the content item 20.

When the user releases the multitouch gesture, the control unit 110 removes the graphical object 10 from the touchscreen 130 as illustrated in screen 340. Here, as the graphical object 10 is in the move mode, the content item 20 is moved (removed from the home screen) to a storage region of the storage unit 120 allocated to the graphical object 10. Although a single content item is moved in FIG. 4A, it is evident that two or more content items may also be moved simultaneously.

In FIG. 4A, a content item is moved above the graphical object 10 (in a drag and drop motion) to form a link between the graphical object 10 and the content item. Alternatively, referring to FIG. 4B, the graphical object is moved to a specific content item to form a link between the graphical object and the content item. More specifically, as illustrated in screens 410 and 420, the user may create a graphical object 10 through a multitouch input and move the graphical object 10 freely around content items. Here, among content items on the home screen, those content items on the movement path of the graphical object 10 can be linked with the graphical object 10. When a content item not to be moved is on the movement path of the graphical object 10, the user may remove the graphical object 10 by releasing the multitouch input, and recreate the graphical object 10 at a location where a content item to be linked is present. The content item is linked with the graphical object 10 only when the graphical object 10 overlaps with a content item for a preset time or more. That is, to link only desired content items with the graphical object 10, the user may move the graphical object 10 along a path so that the graphical object 10 stays for a preset time on a content item to be linked and quickly passes a content item not to be linked.

A content item is linked with the graphical object by means of a flick event. For example, referring to FIG. 4C, when a content item 30 is flicked by the user toward a graphical object 10 as illustrated in screen 430, the control unit 110 may move the content item 30 toward the graphical object 10 as illustrated in screens 440 and 450. When the content item 30 is moved close to the graphical object 10, the control unit 110 may link the content item 30 with the graphical object 10 as illustrated in screen 460. That is, the control unit 110 may move the content item 30 to a storage area allocated to the graphical object 10.

Referring to FIG. 5, multiple content items on the same row or column are simultaneously moved to the graphical object 10. For example, as illustrated in screen 510, the user may create a graphical object 10 at one end of a row of content items. After creation of the graphical object 10, when a preset time duration elapses or a preset signal (like double touch) is input to the graphical object 10, the control unit 110 may move multiple content items on the same row to the graphical object 10 as illustrated in screen 520 and screen 530. Here, the touchscreen 130 outputs animated effects depicting flow of content items into the graphical object 10. Likewise, multiple content items on the same column are simultaneously moved to the graphical object 10.

In the above description of the move mode, a content item is moved to the graphical object 10 and removed from the home screen. Alternatively, when the user touches a content item, moves the content item toward the graphical object 10, passes the graphical object 10 and then releases the content item, the control unit 110 may operate according to a copy mode and return the content item to its original location. In other words, the control unit 110 may distinguish the move mode from the copy mode depending on a touch-release location. On the other hand, in the event that the copy mode and the move mode are separately used, the control unit 110 may not distinguish a touch-release occurring before passing the graphical object from a touch-release occurring after passing the graphical object (i.e., operate in either the copy mode or the move mode regardless of the touch-release location).

Figure 6:
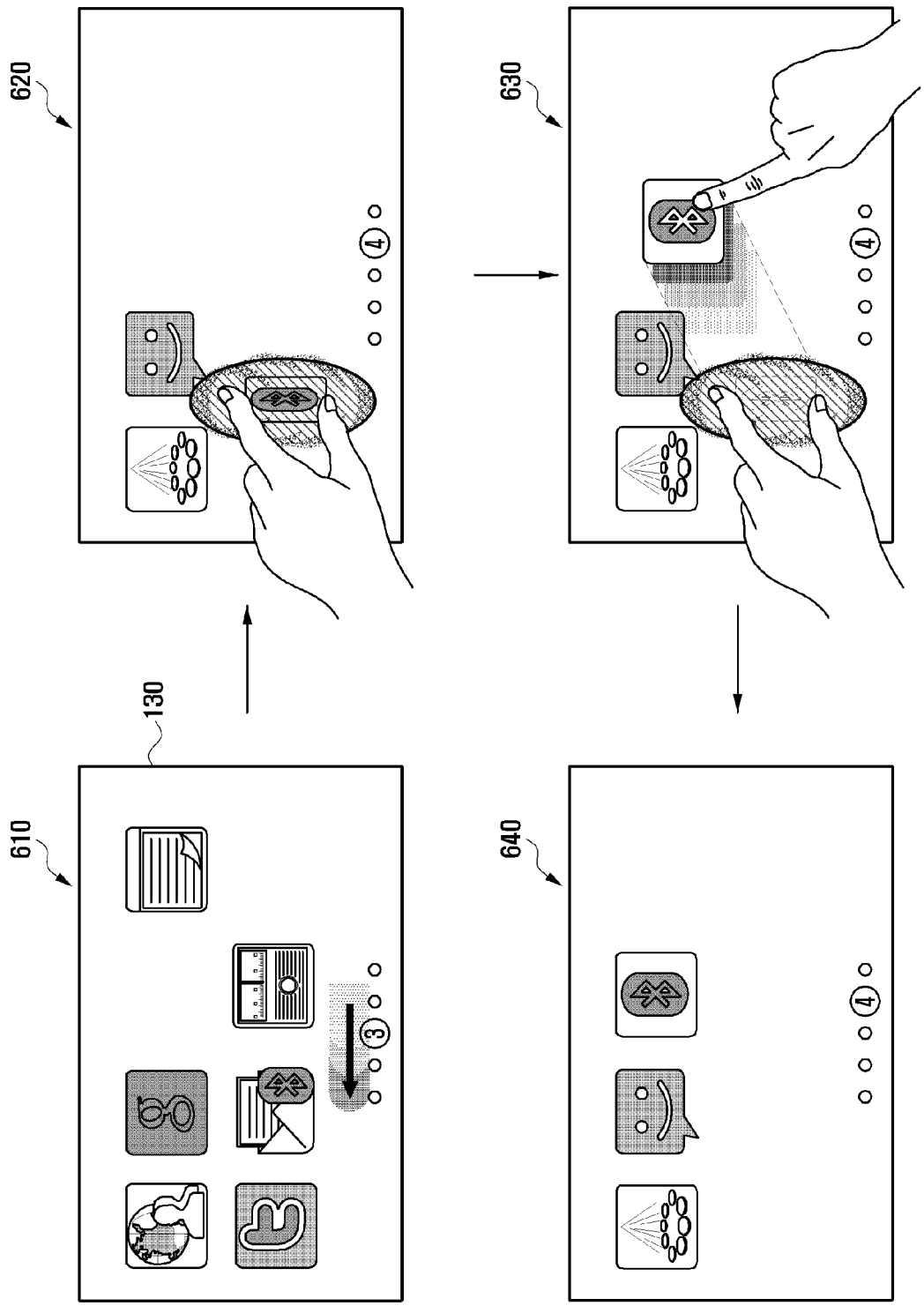
FIG. 6 is a diagram illustrating screen representations for movement of a content item stored in a storage region of the graphical object to the current screen, according to an embodiment of the present invention.
Figure 7:
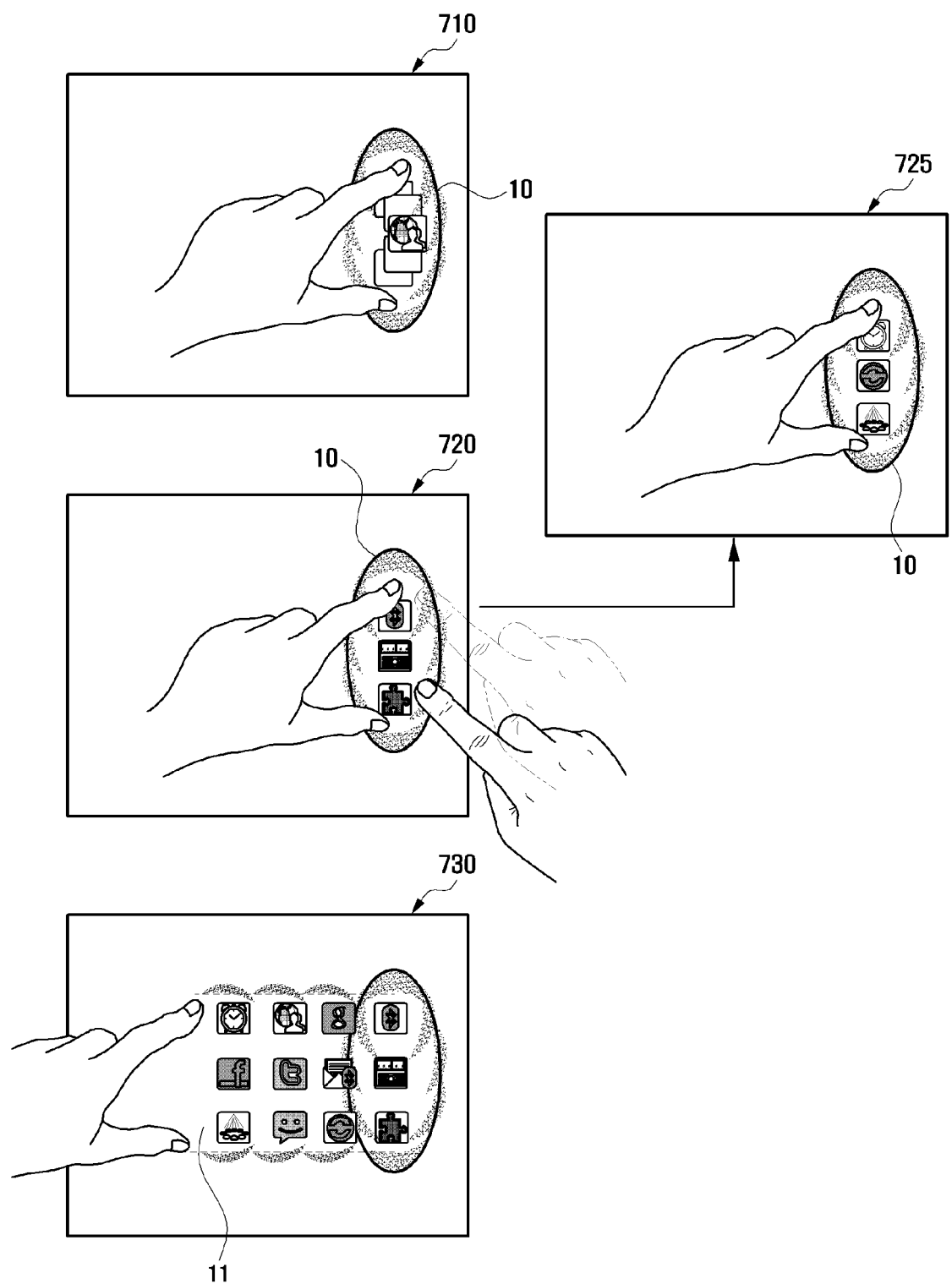
FIG. 7 is a diagram illustrating screen representations for displaying stored content items on the graphical object, according to an embodiment of the present invention.

FIG. 6 is a diagram of screen representations illustrating movement of a content item stored in a storage region of the graphical object to the current screen. FIG. 7 is a diagram of screen representations illustrating display of stored content items on the graphical object.

Referring to FIG. 6, as illustrated in screen 610, when a touch move event such as scroll or flick is detected in a state in which the third page of the home screen is output, the control unit 110 controls the touchscreen 130 to output the fourth page of the home screen as illustrated in screen 620.

When the user makes a stretch gesture in a state in which the fourth page is output, the control unit 110 controls the touchscreen 130 to display the graphical object 10 as illustrated in screen 620. Here, the control unit 110 displays multiple content items, which are stored in the storage region allocated to the graphical object 10 by means of schemes described in connection to FIGS. 4 and 5, within the graphical object 10. For example, referring to FIG. 7, multiple content items are displayed in the graphical object 10 so that they partially overlap each other as illustrated in screen 710. When content items are displayed in overlap, the control unit 110 may move the content items to the home screen in a toggle-like fashion. As illustrated in screen 720, content items are displayed in the graphical object 10 so that they do not overlap each other. When content items do not overlap each other, the user may select at least one of the content items and move the selected content item to the home screen (in a drag and drop motion). The user may scroll through content items to select a content item not being displayed. For example, when the user makes a touch move gesture in a content item arrangement direction (for example, in a vertical direction) as illustrated in screen 720, the control unit 110 displays new content items in the graphical object 10 as illustrated in screen 725. Here, content items are scrolled through one by one or page by page. In addition, the control unit 110 may enlarge the graphical object 10 in response to a user gesture, and arrange many content items in the enlarged graphical object 10. For example, as illustrated in screen 730, when the user enlarges the graphical object 10 in the left direction through stretch and touch-move gestures, many content items are arranged in a matrix form within the enlarged graphical object 10.

Thereafter, the user moves at least one of the content items displayed in the graphical object 10 to the home screen (in a drag and drop motion). For example, as illustrated in screen 630 in FIG. 6, the user may move a content item in the graphical object 10 to the fourth page of the home screen by touching, moving and releasing the content item. Here, the user may also move two or more content items at once using a multitouch gesture. When the multitouch input for graphical object creation is released, the touchscreen 130 may remove the graphical object 10 from the home screen as illustrated in screen 640.

In FIG. 6, a content item in the graphical object 10 is moved to the home screen. When a content item is moved from the graphical object to the screen, different functions are applied to the content item according to the type of a currently active application. For example, in the event that a graphical object 10 is created in an e-mail composition screen and a file (document, image or music file) is moved from the graphical object 10 to the e-mail composition screen, the control unit 110 attaches the file to the current e-mail as an attachment. As another example, when a graphical object 10 is created in a document writing screen and an image file is moved from the graphical object 10 to the document writing screen, the control unit 110 may insert the image file into the current document as an image object. As another example, when a graphical object 10 is created in a document writing screen and a text object is moved from the graphical object 10 to the document writing screen, the control unit 110 may insert the text body of the object into the current document (paste). Here, the text object is a content item that is stored in the storage region allocated to the graphical object 10 and contains text data extracted from a text message, webpage or document file.

In FIG. 7, when the graphical object 10 is created, content items stored in the storage region are displayed. Alternatively, after creation of the graphical object 10, stored content items are displayed in response to input of a preset gesture.

When stored content items are displayed in the graphical object 10, the control unit 110 deactivates selectivity of some content items according to the type of the currently active application. For example, when an image gallery application is being executed, the control unit 110 may deactivate selectivity of those content items containing moving images or documents in the graphical object 10, or hide them.

Using the schemes described in FIGS. 4A and 6, the user moves or copies one or more content items from a first screen to a second screen. Specifically, the user may create a graphical object 10 on the first screen and move or copy one or more content items to the graphical object 10. After transitioning to the second screen, the user may create the graphical object 10 on the second screen and take the moved or copied content items out of the graphical object 10.

Figure 8A:
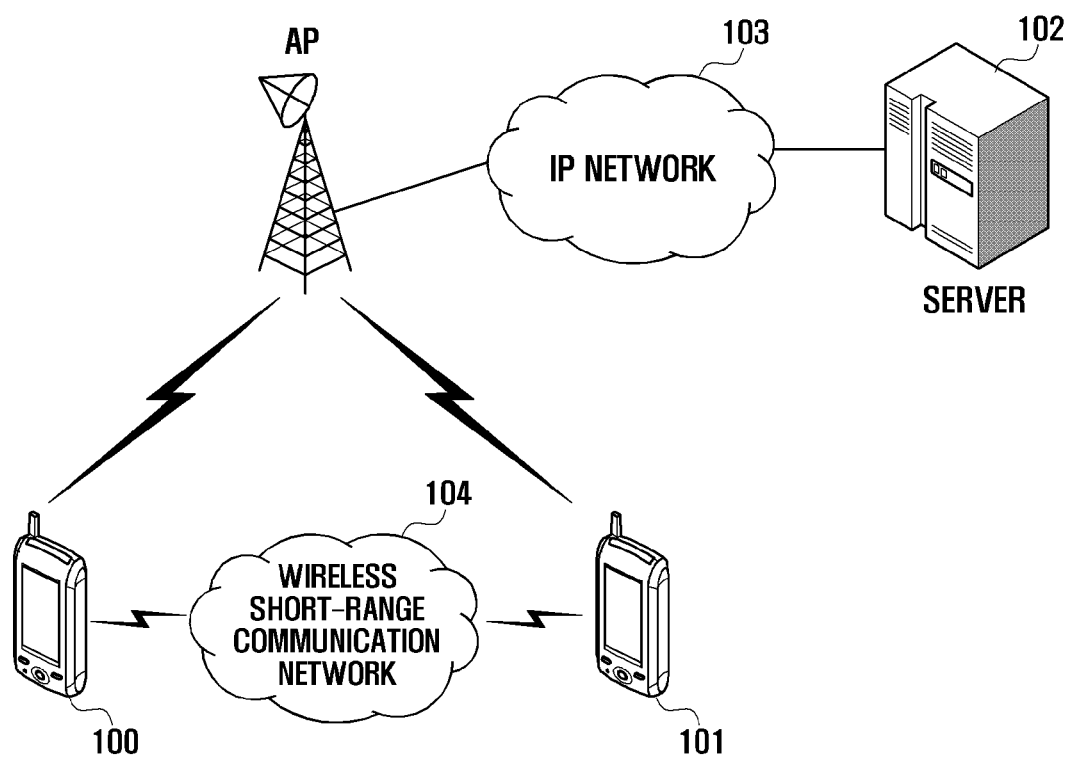
FIG. 8A is a diagram illustrating a network architecture for transmitting a content item to another mobile terminal or a server, according to an embodiment of the present invention.

FIG. 8A illustrates transmission of a content item to an external mobile terminal or a server through an access point.

Referring to FIG. 8A, the mobile terminal 100 is connected to an external mobile terminal 101 or to a server 102 through an Access Point (AP). When the mobile terminal 100 is connected to the external mobile terminal 101 (or to the server 102) and the graphical object 10 is in the terminal transfer mode (or in the server transfer mode), the terminal sends a content item to the external mobile terminal 101 (or to the server 102). In the following description, the terminal transfer mode may be referred to as a first transfer mode, and the server transfer mode may be referred to as a second transfer mode.

To send a content item to the external mobile terminal 101, the mobile terminal 100 and the external mobile terminal 101 are connected to the access point through Wi-Fi. When the graphical object 10 is in the first transfer mode, the mobile terminal 100 may broadcast a message indicating activation of the first transfer mode. Also, when the graphical object 10 is in the first transfer mode, the external mobile terminal 101 may broadcast a message indicating activation of the first transfer mode. Upon reception of the broadcast message, the mobile terminal 100 (or the external mobile terminal 101) sends a response message to the external mobile terminal 101 (or to the mobile terminal 100). Here, when the graphical object 10 is not created, the mobile terminal 100 (or the external mobile terminal 101) does not send a response message.

After the external mobile terminal 101 receives a broadcast message or response message, the mobile terminal 100 establishes a communication channel with the external mobile terminal 101 in the first transfer mode. That is, a communication channel may be established between the graphical object 10 of the mobile terminal 100 and that of the external mobile terminal 101. After the mobile terminal 100 receives a broadcast message or response message, the external mobile terminal 101 may establish a communication channel with the mobile terminal 100 in the first transfer mode. Thereafter, when the user of the mobile terminal 100 links the graphical object 10 with a content item, the mobile terminal 100 sends the content item to the external mobile terminal 101. When the user of the external mobile terminal 101 links the graphical object 10 with a content item, the external mobile terminal 101 sends the content item to the mobile terminal 100.

To send a content item to the server 102, the mobile terminal 100 connects through Wi-Fi to the access point, which is connected to the server 102 through an IP network 103. Thereafter, when the graphical object 10 is in the second transfer mode, the mobile terminal 100 may establish a communication channel with the server 102. That is, to establish a communication channel, the mobile terminal 100 sends a request message for channel establishment to the server 102 and receive a response message from the server 102. Accordingly, the mobile terminal 100 may pre-store information on the server 102 (such as an IP address, MAC address and port number). When a plurality of servers are present, the mobile terminal 100 outputs a list of servers so that the user can select a server to which a content item is to be sent.

In the above description, the mobile terminal 100 sends a content item to the external mobile terminal 101 or the server 102 through the access point. Alternatively, as one example, when the graphical object 10 is in the first transfer mode, the mobile terminal 100 may also send a content item to the external mobile terminal 101 through Bluetooth®, ZigBee, HomeRF, DLNA or InfraRed communication. That is, a communication channel between the mobile terminal 100 and the external mobile terminal 101 may be established through a wireless short-range communication network 104. In addition, when the graphical object 10 is in the second transfer mode, the mobile terminal 100 sends a content item to the server 102 through a mobile communication network (for example, a third generation communication network or a fourth generation communication network such as an LTE or WiBro network).

FIGS. 8B and 8C are diagrams of screen representations illustrating transmission of a content item to another mobile terminal using a graphical object. For ease of description, a mobile terminal sending a content item is referred to as a sender terminal; another mobile terminal receiving the content item is referred to as a receiver terminal; and the sender terminal and the receiver terminal are assumed to have the same configuration.

Referring to FIGS. 8B and 8C, to transmit a content item, the user of the sender terminal creates a graphical object 10 as illustrated in screen 810. Here, as illustrated in screen 840 in FIG. 8C, the user of the receiver terminal may also create a graphical object 10. In the case that the receiver terminal is pre-specified by the sender terminal, the graphical object 10 may be automatically created at the receiver terminal.

After creation of the graphical object 10, the control unit 110 of the sender terminal checks whether a receiver terminal with a graphical object 10 enabled is present in the vicinity. The process for checking presence of a nearby receiver terminal is described with reference to FIG. 8A. When a receiver terminal with a graphical object 10 enabled is present in the vicinity of the sender terminal, the control unit 110 of the sender terminal establishes a wireless short-range communication channel with the receiver terminal and set the mode of the graphical object 10 to the first transfer mode.

When the user of the sender terminal touches a content item, moves the content item and releases the content item on the graphical object 10 as illustrated in screen 820, the control unit 110 of the sender terminal controls the short-range wireless unit 170 to send the content item to the receiver terminal as illustrated in screen 830. Here, the touchscreen 130 of the sender terminal produces visual effects depicting the content item flowing into the graphical object 10. In FIGS. 8B and 8C, a content item is moved to the receiver terminal. An option may be set so that a copy of a content item is moved to the receiver terminal. In this case, the touchscreen 130 of the sender terminal produces at least one of visual effects depicting a copied version of a content item flowing into the graphical object 10 and visual effects depicting the content item being returned to the original location.

The receiver terminal receives the content item sent by the sender terminal. During reception of the content item, the receiver terminal outputs visual effects depicting progress of reception as illustrated in screens 843, 845 and 847 in FIG. 8C. Here, to notify progress of content reception to the user, various visual effects or means may be used in the present invention.

Upon completion of reception, the control unit 110 of the receiver terminal displays the received content item on the screen as illustrated in screen 850. Here, the touchscreen 130 of the receiver terminal outputs visual effects depicting the content item coming out of the graphical object 10.

Thereafter, the control unit 110 of the receiver terminal places the received content item on the screen according to a preset arrangement as illustrated in screen 855. For example, the received content item is placed at the beginning or end of existing content items.

As described above, the mobile terminal 100 can easily send a content item to another mobile terminal using a graphical object 10 without a complex procedure.

In FIG. 8C, at the receiver terminal, the received content item is moved to the screen immediately after reception. Alternatively, the receiver terminal may keep the received content item in the graphical object 10 and move the received content item to the screen in response to a preset gesture. This enables the user to place the received content item at a desired location or screen.

When the received content item is an application to be installed, the control unit 110 of the receiver terminal sends a request for an installation file to the sender terminal, and receives the installation file therefrom and installs the installation file for the application. Alternatively, when a content item to be sent is an application, the control unit 110 of the sender terminal sends both the content item and an installation file for the content item to the receiver terminal.

A wireless short-range communication channel for content item transmission is established using various techniques such as Bluetooth®, Wi-Fi, Wi-Fi Peer to Peer, Wi-Fi Direct, InfraRed and HomeRF communication. A paring procedure is performed in advance for establishing a wireless short-range communication channel between the sender terminal and the receiver terminal. Alternatively, the sender terminal may broadcast a pairing message when a graphical object 10 is created, and automatically perform a paring procedure when a response message is received from a receiver terminal.

In the above description, a sender terminal and a receiver terminal are separately used. However, the mobile terminal 100 is used as a sender terminal or as a receiver terminal depending upon circumstances. Although a wireless communication channel is established between two mobile terminals, in this description, three or more mobile terminals may also be connected through a communication channel, and sends and receive a content item using graphical objects. When three or more mobile terminals are connected, the sender terminal sends a content item to all or some of the remaining terminals. Here, the sender terminal outputs a list of mobile terminals connected thereto and sends a content item to only mobile terminals selected from the list.

Figure 9:
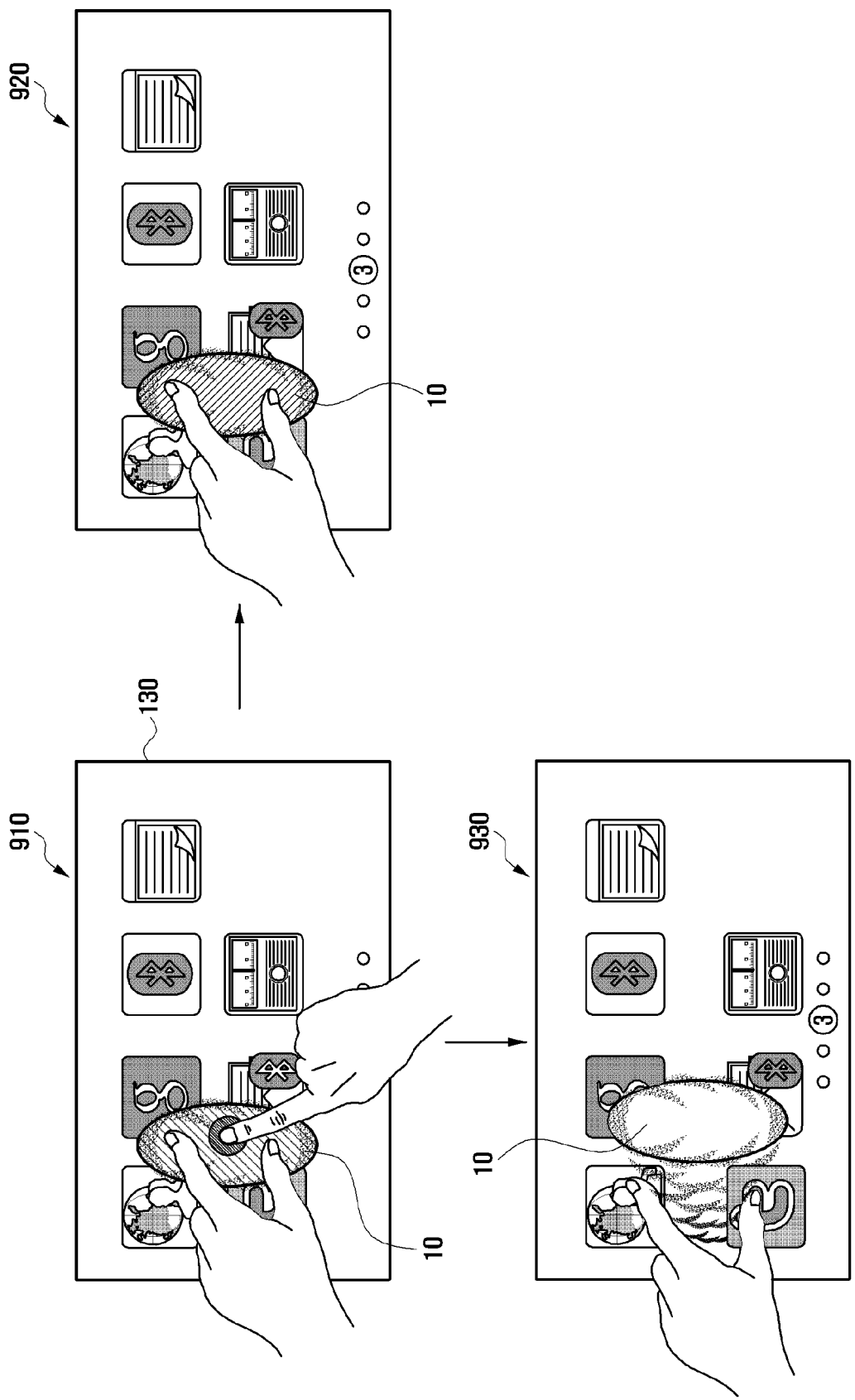
FIG. 9 is a diagram illustrating screen representations for changing the mode of a graphical object, according to an embodiment of the present invention.

FIG. 9 is a diagram of screen representations illustrating change of the mode of a graphical object.

Referring to FIG. 9, the control unit 110 may change the mode of a graphical object 10 according to user input. For example, when a touch event is detected on the graphical object 10 as illustrated in screen 910, the control unit 110 may change the mode of the graphical object 10. Here, to notify the user of a mode change, the control unit 110 controls the touchscreen 130 to change at least one of the shape and color of the graphical object 10. For example, as illustrated in screen 920, the touchscreen 130 may change the color of the graphical object 10 according to the mode thereof. In screen 920, the color change is indicated by change of the hatching direction. As illustrated in screen 930, the touchscreen 130 may change the shape of the graphical object 10 according to the mode thereof. The control unit 110 outputs an audible alert indicating mode change of the graphical object 10.

In FIG. 9, the mode of the graphical object 10 is changed in response to a touch on the graphical object 10. Alternatively, the mode of the graphical object 10 may also be changed in response to occurrence of a preset gesture. For example, when a touch is made on the graphical object 10 and moved in a horizontal direction, the mode of the graphical object 10 is changed in sequence according to a preset rule. The mobile terminal 100 may pre-store information on mappings between graphical object modes and touch-move directions, and change the mode of the graphical object 10 according to touch-move directions. Alternatively, when the user releases one of the fingers touching the graphical object 10 and touches the graphical object 10 again with the released finger, the control unit 110 may change the mode of the graphical object 10.

Figure 10:
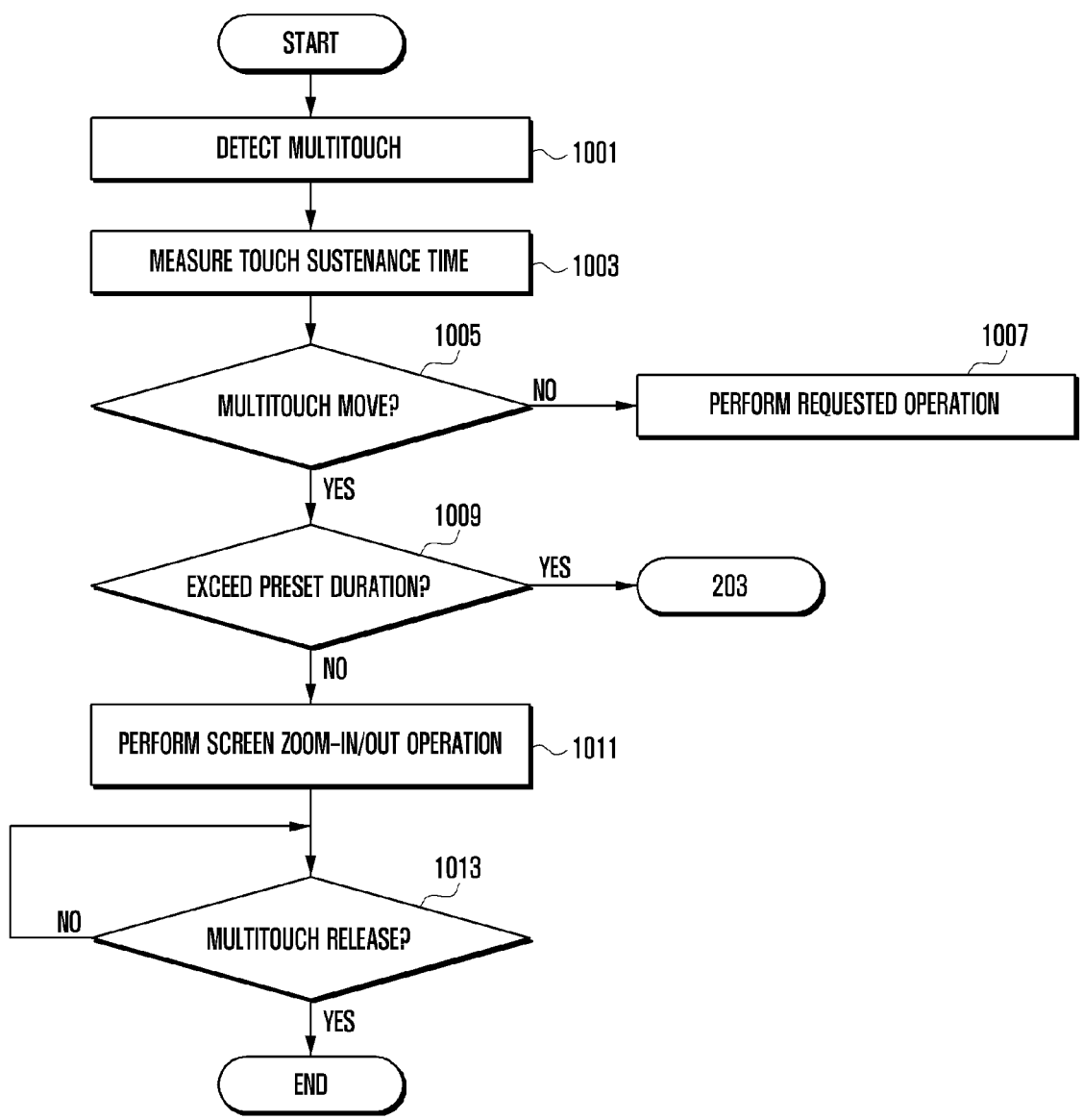
FIG. 10 is a flowchart of a content control method based on a graphical object according to an embodiment of the present invention, according to an embodiment of the present invention.
Figure 11:
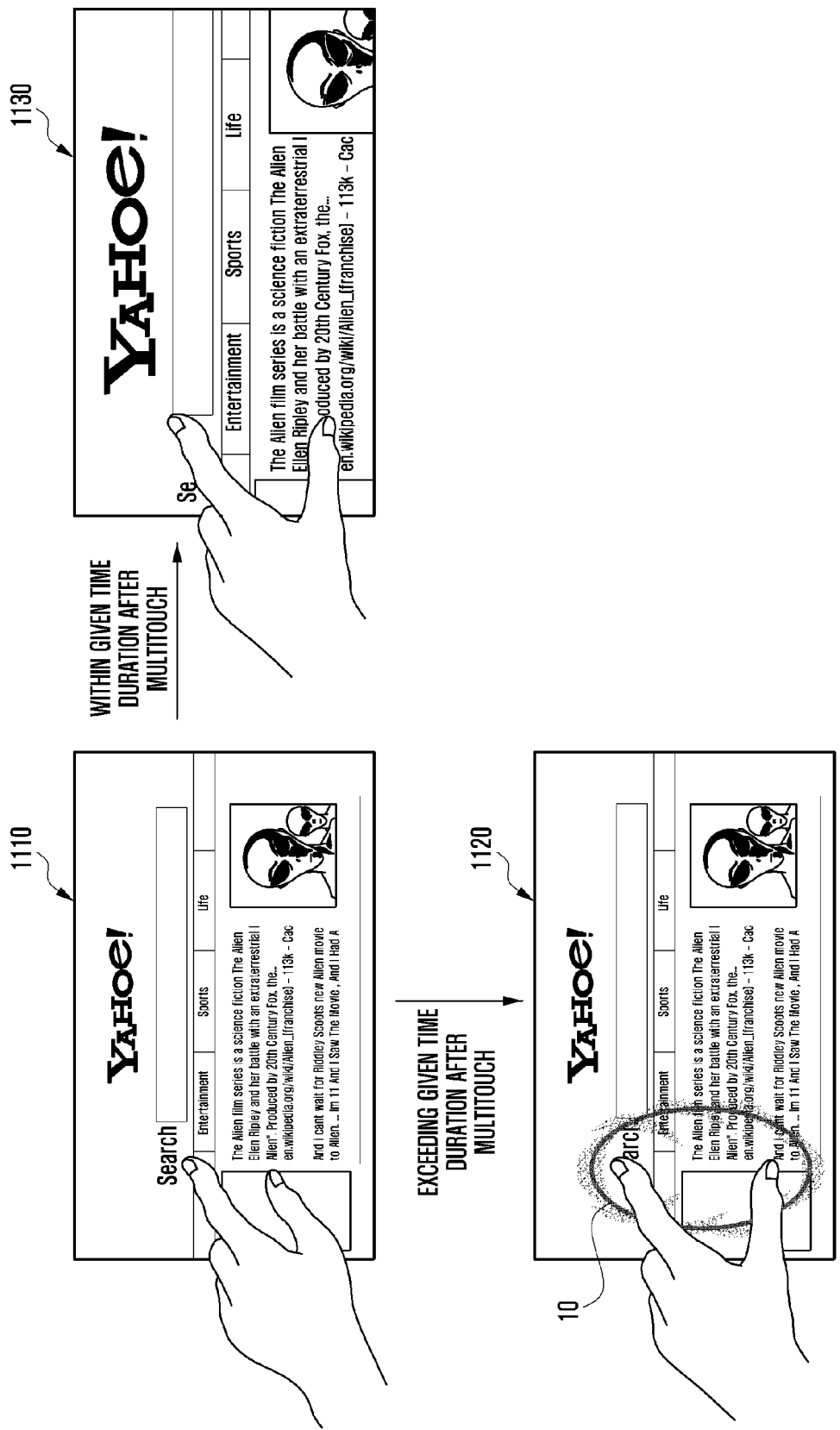
FIG. 11 is a diagram illustrating screen representations for the method of FIG. 10, according to an embodiment of the present invention.

FIG. 10 is a flowchart of a content control method based on a graphical object according to an embodiment of the present invention. FIG. 11 is a diagram of screen representations illustrating the method of FIG. 10.

Referring to FIG. 10, the control unit 110 detects multitouch with at least two touch points in Step 1001. For example, as illustrated in screen 1110 in FIG. 11, the user may make a multitouch gesture on a webpage output on the screen.

The control unit 110 starts to measure the touch sustenance time in Step 1003. The control unit 110 checks whether a multitouch move like a stretch or a pinch is detected in Step 1005. When a multitouch move is not detected, the control unit 110 may perform a requested operation in Step 1007. For example, the control unit 110 may perform a function mapped to a long touch or touch-release. When a multitouch move is detected, the control unit 110 checks whether the touch sustenance time is longer than a preset time duration (for example, 0.5 seconds or 1 second) in Step 1009. When the touch sustenance time is longer than the preset time duration, the control unit 110 proceeds to Step 203 (creation of a graphical object) in FIG. 2. For example, as illustrated in screen 1120, the control unit 110 may create a graphical object 10 and display the same at the touched region. When the touch sustenance time is not longer than the preset time duration, the control unit 110 performs a screen zooming operation corresponding to the multitouch move in Step 1011. For example, when a stretch event occurs within the preset time duration after the occurrence time of the multitouch event, the control unit 110 may enlarge the current screen as illustrated in screen 1130. The control unit 110 checks whether the multitouch is released in Step 1013. When the multitouch is not released, the control unit 110 continues to conduct a screen zooming operation. When the multitouch is released, the control unit 110 ends the content control procedure based on a graphical object.

In FIG. 10, requests for graphical object creation and zooming operation are distinguished depending on the time interval between occurrences of a multitouch and a multitouch move. Alternatively, as one example, requests for graphical object creation and zooming operation are distinguished depending on a touch direction. That is, when a stretch or pinch occurs in a preset direction after occurrence of a multitouch, the control unit 110 may perform a zooming operation; and when a stretch or pinch occurs in a direction other than the preset direction after occurrence of a multitouch, the control unit 110 may perform graphical object creation. Here, the touch direction is specified using a range of angles (for example, greater than or equal to 45 degrees and less than 90 degrees).

Hereinabove, the graphical object 10 has been used in the first transfer mode or second transfer mode. Alternatively, as one example, the graphical object 10 may also be used in a delete mode for deleting a content item from the mobile terminal 100 or in an uninstall mode for uninstalling a content item. The graphical object 10 is used in a change attribute mode for changing an attribute of a content item. In the change attribute mode, an image file is changed in color or in size. The graphical object 10 is used in a compress mode. When the graphical object 10 is in the compress mode, content items (files or folders) are compressed in a preset format.

In the event that the graphical object 10 is removed when the corresponding touch input is released, when the user moves the graphical object 10 to a preset docking region or makes a preset docking gesture (for example, a circular or triangular gesture), the control unit 110 places the graphical object 10 in the docking region. To remove the graphical object 10 placed in the docking region, the user may have to enter a preset removal signal by making a preset gesture or entering a cancel key. When the user moves the graphical object 10 out of the docking region and releases touch, the control unit 110 may also remove the graphical object 10.

Figure 12:
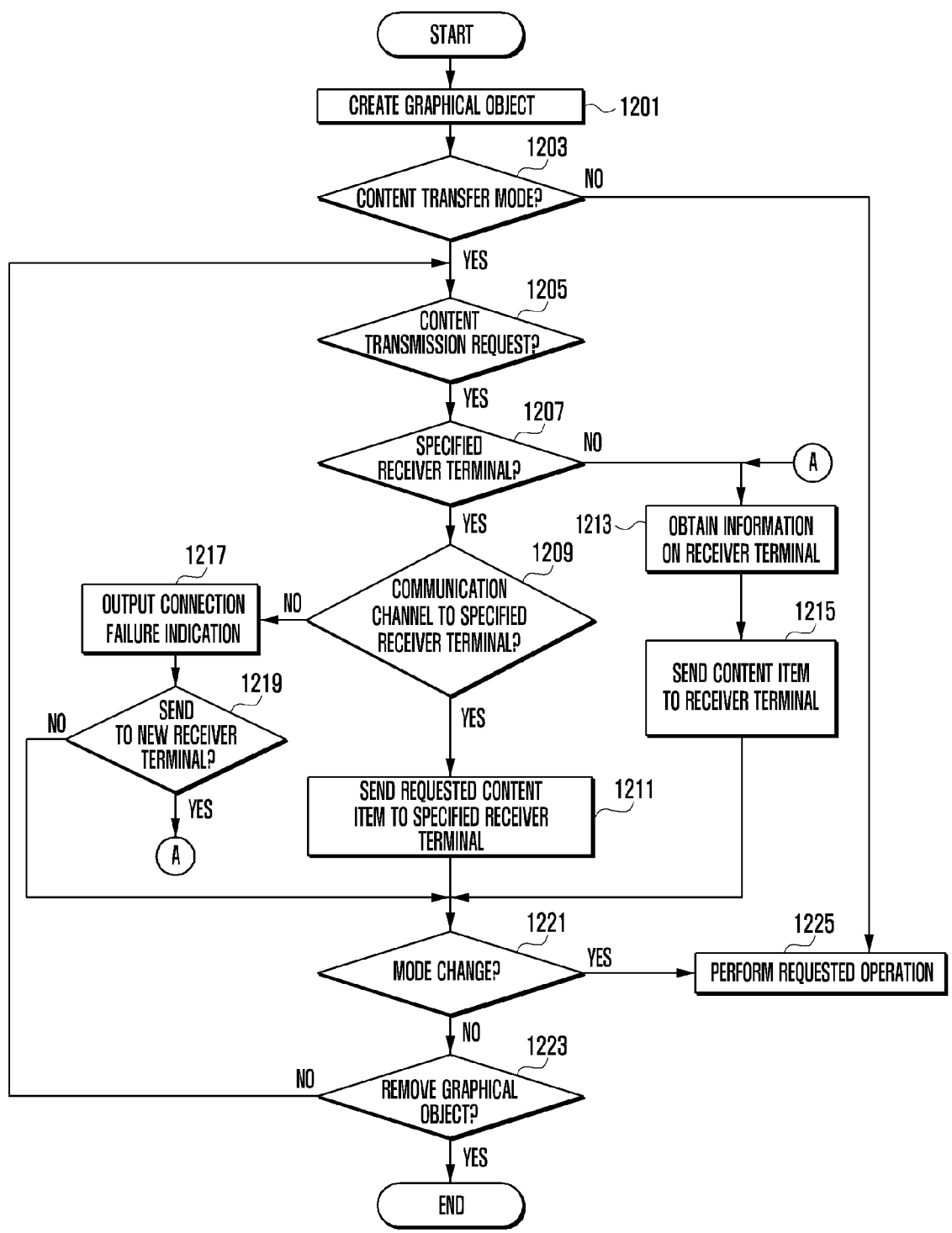
FIG. 12 is a flowchart of a content transmission method based on a graphical object according to an embodiment of the present invention.

FIG. 12 is a flowchart of a content transmission method based on a graphical object according to an embodiment of the present invention.

Referring to FIG. 12, the control unit 110 creates a graphical object 10 in Step 1201. The control unit 110 checks whether the graphical object 10 is in the content transfer mode in Step 1203. When the graphical object 10 is not in the content transfer mode, the control unit 110 may perform a requested operation in Step 1225. For example, the control unit 110 may perform an operation according to the copy mode, move mode, delete mode or compress mode. When the graphical object 10 is in the content transfer mode, the control unit 110 checks presence of a content item to be sent in Step 1205. When a content item to be sent is not present, the control unit 110 proceeds to Step 1221. When a content item to be sent is present, the control unit 110 checks whether a receiver terminal is specified in Step 1207. When a receiver terminal is not specified, the control unit 110 proceeds to Step 1217. When a receiver terminal is specified, the control unit 110 checks whether a communication channel to the receiver terminal is established in Step 1209. When a communication channel to the receiver terminal is established, the control unit 110 sends the content item to be sent to the receiver terminal in Step 1211. Here, the receiver terminal may create a graphical object 10 without a touch input and receive the content item via the graphical object 10.

When a communication channel to the receiver terminal is not established, the control unit 110 outputs a connection failure indication in Step 1213, and checks whether a new receiver terminal is to be specified in Step 1215. When a new receiver terminal does not need to be specified, the control unit 110 proceeds to Step 1221. When a new receiver terminal needs to be specified, the control unit 110 proceeds to Step 1217.

The control unit 110 receives information on a receiver terminal to be connected in Step 1217. Here, the control unit 110 outputs an information input window on the screen. Information on a receiver terminal includes an IP address, identifier and password. After obtaining information on a receiver terminal, the control unit 110 establishes a communication channel to the receiver terminal depending on the obtained information and sends the content item to the receiver terminal in Step 1219.

The control unit 110 checks whether a mode change is requested in Step 1221. When a mode change is requested, the control unit 110 performs an operation according to a new mode in Step 1225. For example, the control unit 110 may perform an operation corresponding to the copy, move, delete or compress mode. When mode change is not requested, the control unit 110 checks whether a graphical object removal request is issued in Step 1223. As described before, a graphical object removal request may be made in various ways. When a graphical object removal request is not issued, the control unit 110 returns to Step 1205 and continues operation. When a graphical object removal request is issued, the control unit 110 removes the graphical object 10.

In the above description, when a receiver terminal is not specified, terminal information is input. Alternatively, as one example, when a receiver terminal is not specified, the control unit 110 outputs a list of connectable external mobile terminals and establishes a communication channel to an external mobile terminal selected from the list.

Figure 13:
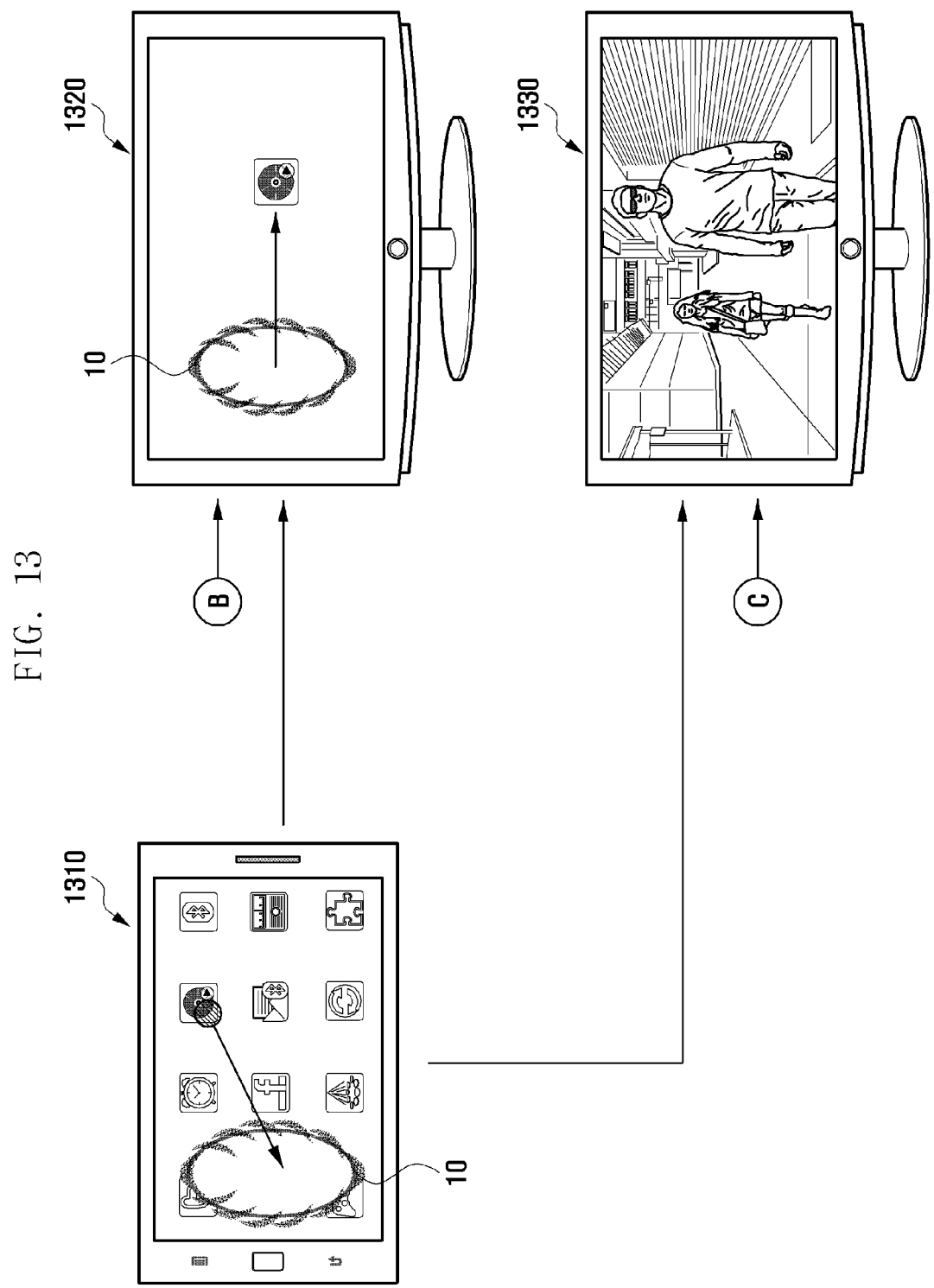
FIGS. 13 to 15 are diagrams illustrating screen representations for transmission of a content item using a graphical object, according to an embodiment of the present invention.
Figure 14:
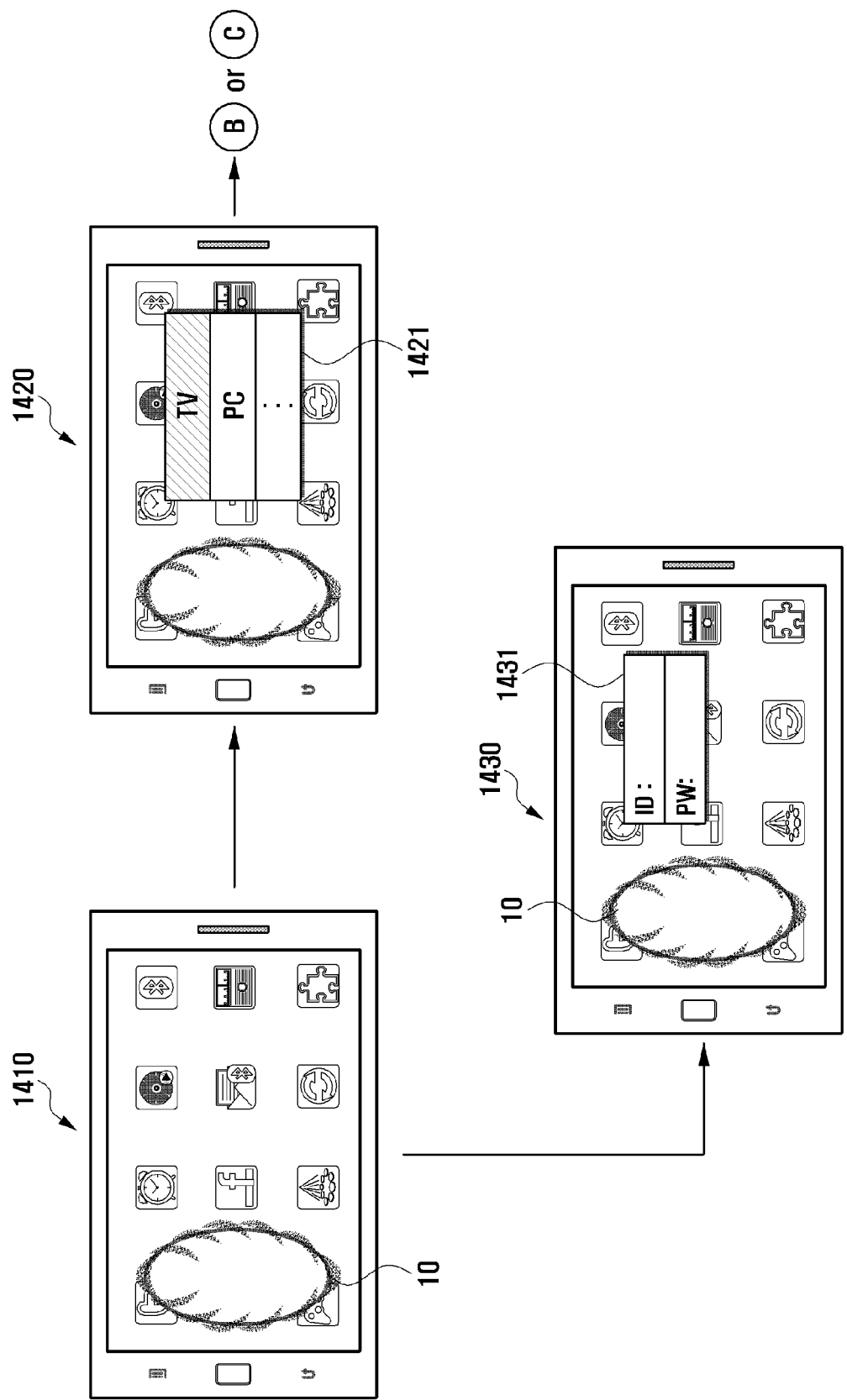
Figure 15:
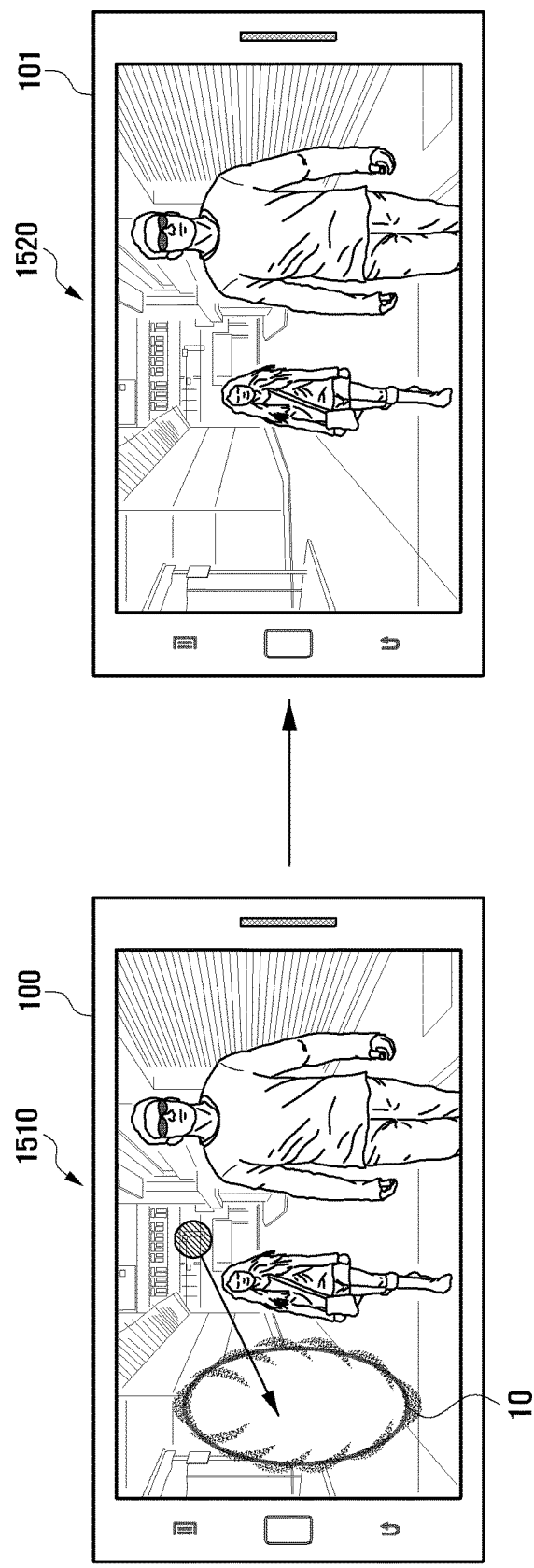

FIGS. 13 to 15 are diagrams of screen representations illustrating transmission of a content item using a graphical object.

Referring to FIG. 13, as illustrated in screen 1310, when a transmission request for a content item is made after a receiver terminal is specified, the control unit 110 sends the content item to the specified receiver terminal. As illustrated in screen 1320, the receiver terminal receives the content item, and creates a graphical object 10 and outputs visual effects depicting the content item coming out of the graphical object 10. When the received content item is a playable item such as a moving image file, audio file or photograph file, the receiver terminal may directly play back the received content item as illustrated in screen 1330.

Referring to FIG. 14, when a receiver terminal is not specified or a communication channel to a receiver terminal is not established, as illustrated in screen 1420, the control unit 110 of the sender terminal outputs a list 1421 of connectable receiver terminals. When a receiver terminal of the list is selected, the control unit 110 sends the content item to the selected receiver terminal. Then, as illustrated in screen 1320 or 1330 in FIG. 13, the receiver terminal may create a graphical object 10 to receive the content item or to directly play back the received content item. Alternatively, when a receiver terminal is not specified or a communication channel to a receiver terminal is not established, as illustrated in screen 1430, the control unit 110 outputs an information input window 1431 to obtain information on a receiver terminal (such as ID and password). For example, when the user creates a graphical object 10 on an online shopping mall webpage and moves a content item to be purchased to the graphical object 10, the control unit 110 may download the content item to be purchased. In response to a transmission request for the downloaded content item, the control unit 110 outputs an information input window to obtain information on a receiver terminal and send the downloaded content item to a receiver terminal depending on the obtained information.

In the above description, the content transfer mode is activated on a screen displaying content items. Alternatively, as one example, referring to FIG. 15, the control unit 110 of the mobile terminal 100 may transmit a content item being played back to a receiver terminal 101. As illustrated in screen 1510, after creation of a graphical object 10 on a content playback screen, when a touch input is made at a portion of the content playback screen and moved to the graphical object 10, the control unit 110 may transmit the content item being played back to the receiver terminal 101. As illustrated in screen 1520, the receiver terminal 101 outputs a content playback screen that may be the same as that of the mobile terminal 100 or be the previous content playback screen thereof (with a delay of several seconds) depending upon network conditions. That is, the mobile terminal 100 can transmit not only a stored content item but also a content item being streamed in real-time to the receiver terminal 101.

Figure 16:
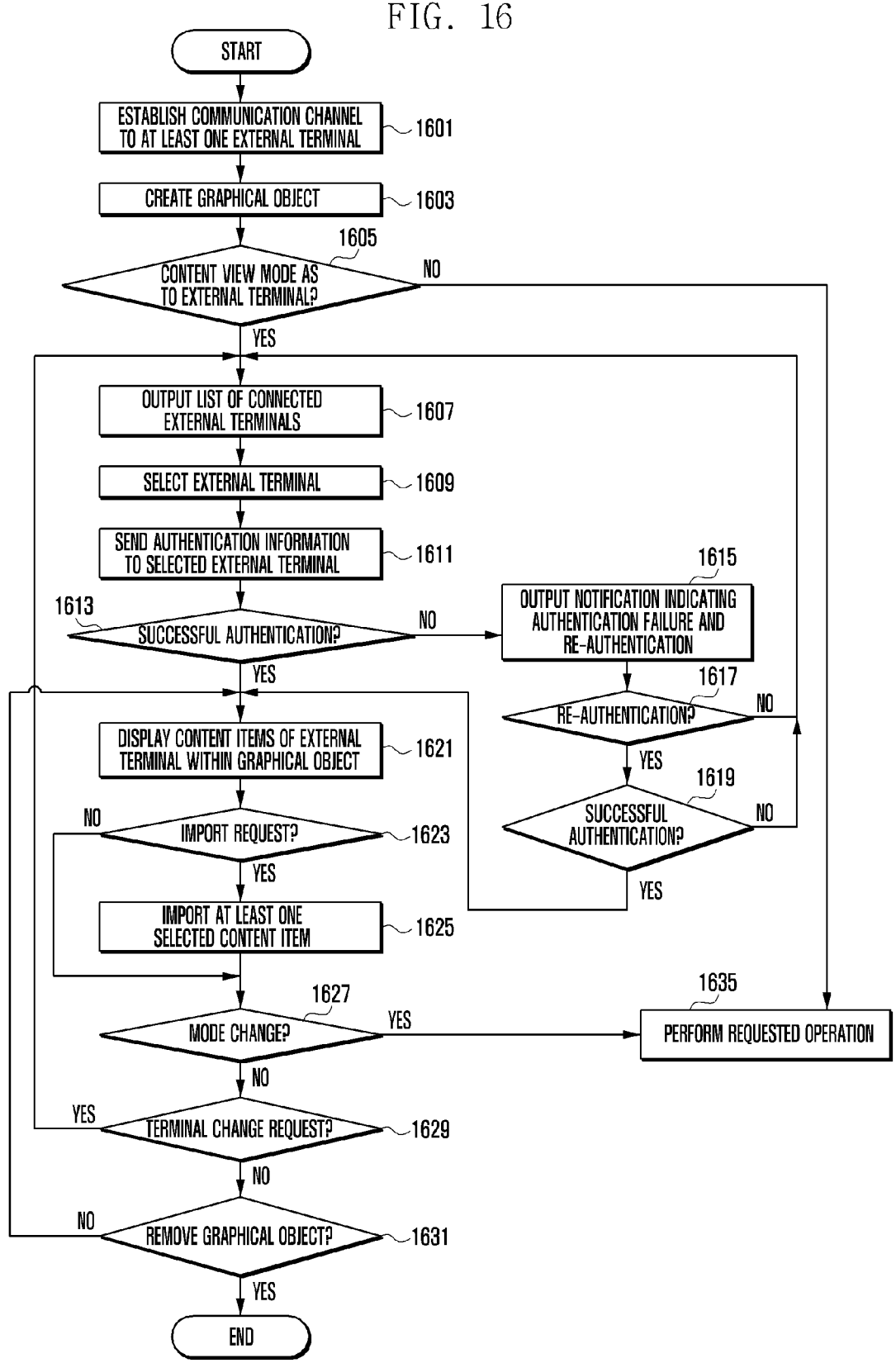
FIG. 16 is a flowchart of a method of viewing a content item stored in another mobile terminal using a graphical object, according to an embodiment of the present invention.
Figure 17:
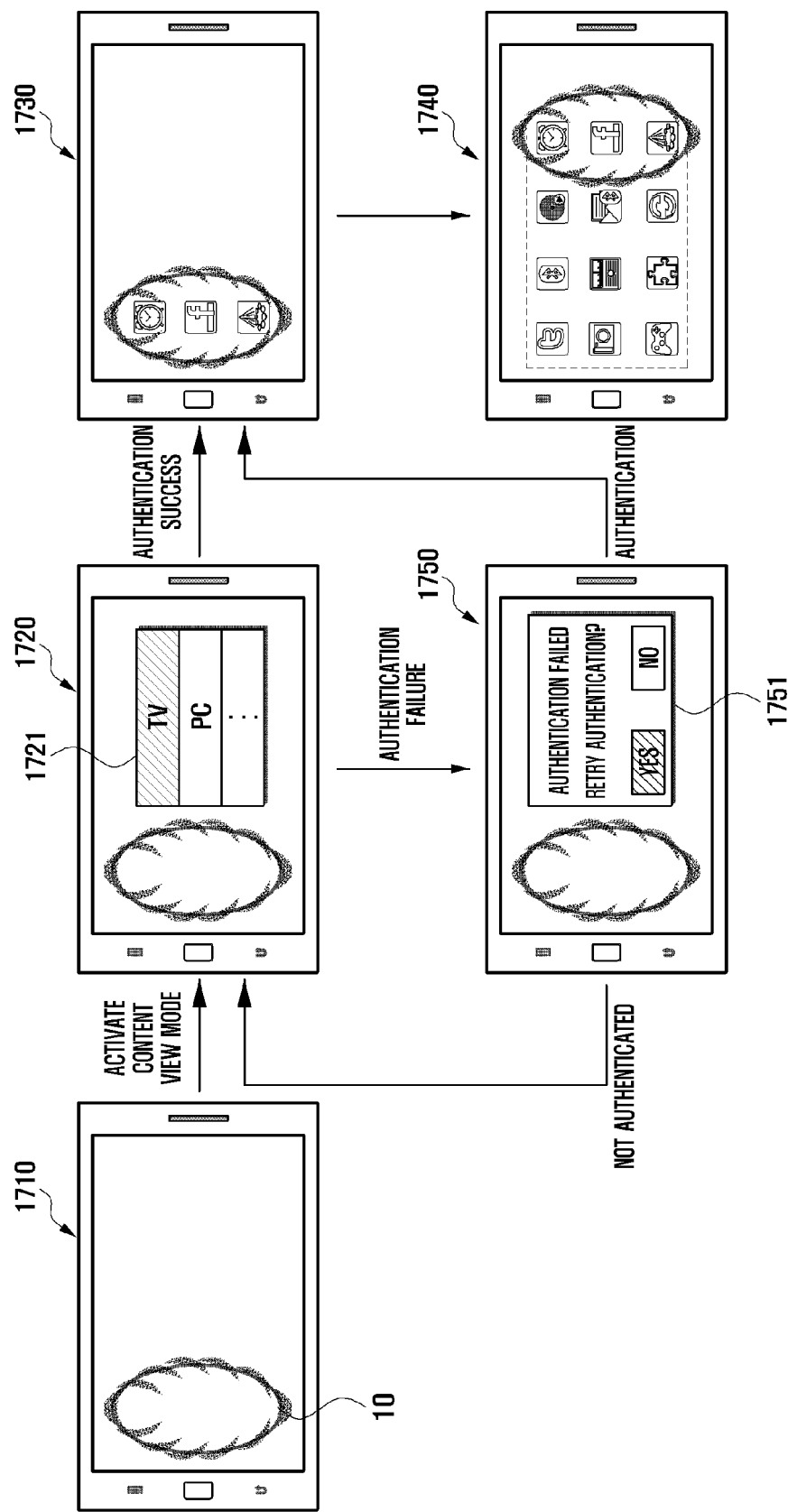
FIG. 17 is a diagram illustrating screen representations for viewing a content item stored in another mobile terminal using a graphical object, according to an embodiment of the present invention.

FIG. 16 is a flowchart of a method of viewing a content item stored in another mobile terminal using a graphical object according to an embodiment of the present invention. FIG. 17 is a diagram of screen representations illustrating viewing of a content item stored in another mobile terminal using a graphical object.

Referring to FIG. 16, the control unit 110 of the mobile terminal 100 establishes a communication channel to at least one external terminal in Step 1601. Here, the communication channel is implemented through the wireless short-range communication network 104. For example, the communication channel is based on DLNA or a home network. The home network is implemented using Wi-Fi, HomeRF, ZigBee, Bluetooth® or Ultra Wideband technology.

The control unit 110 creates a graphical object 10 in Step 1603. As described before with reference to FIGS. 3A to 3D, the graphical object 10 is created through various touch inputs. The control unit 110 checks whether the graphical object 10 is in the content view mode in Step 1605. When the graphical object 10 is not in the content view mode, the control unit 110 may perform a requested operation in Step 1635. For example, the control unit 110 may perform an operation according to the selected mode (copy, delete, move or compress). When the graphical object 10 is in the content view mode, the control unit 110 outputs a list of connected external terminals in Step 1607 and requests the user to select one terminal from the list in Step 1609. For example, as illustrated in screen 1710 in FIG. 17, when the graphical object 10 is created and the mode thereof is set to the content view mode, the control unit 110 outputs a list 1721 of external terminals as illustrated in screen 1720.

After an external terminal is selected, the control unit 110 sends pre-stored authentication information to the selected external terminal in Step 1611. The authentication information serves to verify a right to view a content item, and includes an ID and password or a phone number. The external terminal may check the received authentication information against a rights database and send the authentication result to the mobile terminal 100.

The control unit 110 examines the result of authentication in Step 1613. When authentication is successful, the control unit 110 proceeds to Step 1621. When authentication is unsuccessful, the control unit 110 outputs a notification indicating authentication failure and re-authentication in Step 1615. For example, as illustrated in screen 1750, the control unit 110 outputs a popup window 1751 indicating authentication failure and requesting re-authentication.

The control unit 110 checks whether re-authentication is requested in Step 1617. When re-authentication is not requested (selection of "NO" in the popup window 1751), the control unit 110 returns to Step 1607 and outputs the list of connected external terminals. When re-authentication is requested (selection of "YES" in the popup window 1751), the control unit 110 outputs an authentication information window to obtain authentication information and sends the obtained authentication information to the selected external terminal in Step 1618. The control unit 110 examines the result of authentication in Step 1619. When authentication is unsuccessful, the control unit 110 returns to Step 1615. When authentication is successful, the control unit 110 proceeds to Step 1621.

The control unit 110 displays content items of the external terminal within the graphical object 10 in Step 1621. For example, as illustrated in screen 1730, the control unit 110 displays content items of the external terminal in the graphical object 10. Here, all content items of the external terminal or some content items thereof set to be shared is displayed according to the right of the mobile terminal 100. As illustrated in screen 1740, when the graphical object 10 is extended in a preset direction, the control unit 110 displays an increased number of content items in the extended region of the graphical object 10.

The control unit 110 checks whether an import request is made in Step 1623. An import request is made by touching at least one content item displayed in the graphical object 10 and moving the content item out of the graphical object 10. When an import request is not made, the control unit 110 proceeds to Step 1627. When an import request is made, the control unit 110 imports at least one selected content item in Step 1625. Here, the control unit 110 sends a request for the selected content item to the external terminal and receives the content item from the external terminal in the copy or move mode.

The control unit 110 checks whether mode change is requested in Step 1627. When mode change is requested, the control unit 110 performs an operation according to a new mode in Step 1635. For example, the control unit 110 may perform an operation corresponding to the copy, move, delete or compress mode. When mode change is not requested, the control unit 110 checks whether a terminal change request is made in Step 1629. When a terminal change request is made, the control unit 110 returns to Step 1607. When a terminal change request is not made, the control unit 110 checks whether a graphical object removal request is issued in Step 1631. As described above, a graphical object removal request is made in various ways. When a graphical object removal request is not issued, the control unit 110 returns to Step 1621 and continues operation. When a graphical object removal request is issued, the control unit 110 removes the graphical object 10.

In the above description, the mobile terminal 100 sends authentication information to a selected external terminal. Alternatively, as one example, without sending authentication information at the time of selecting an external terminal, the mobile terminal 100 outputs a password input window when the external terminal requires a password and send a password obtained through the password input window for authentication to the external terminal.

Figure 18:
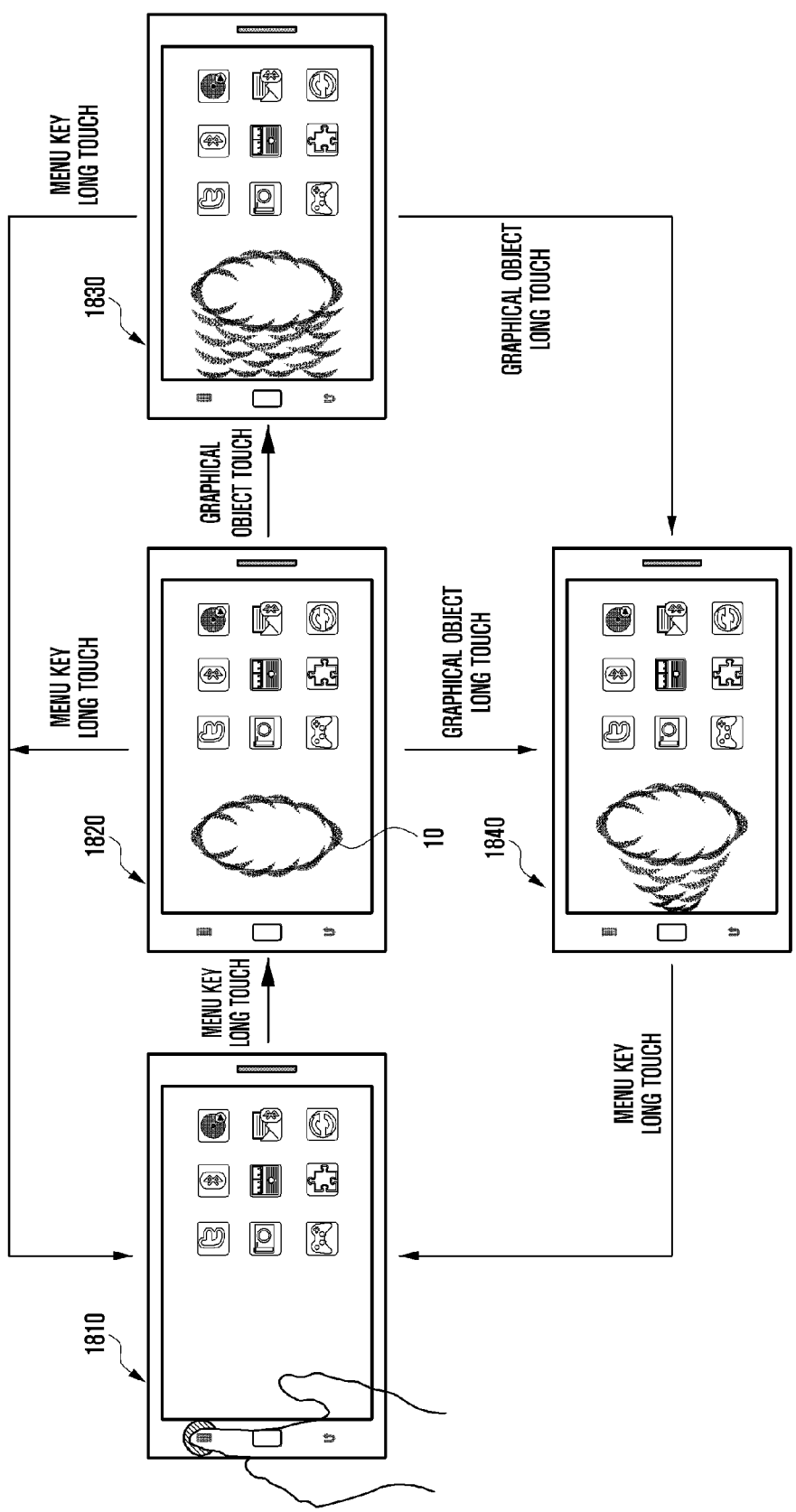
FIG. 18 is a diagram illustrating screen representations for creation and deletion of a graphical object using an external key, according to an embodiment of the present invention.

FIG. 18 is a diagram of screen representations illustrating creation and deletion of a graphical object using an external key. In the following description, the external key is a menu key, as one example. However, another key such as a home key, volume key or search key may also be used as the external key. The external key may also be a separate button key, touch key or soft key assigned to creation and deletion of a graphical object.

In FIG. 18, when a long touch event is generated by touching the menu key for a preset time or more as illustrated in screen 1810, the control unit 110 may create a graphical object 10 at a preset region as illustrated in screen 1820.

When a touch (such as a tap) is entered on the graphical object 10 in a state of screen 1820, the control unit 110 may change the shape of the graphical object 10 as illustrated in screen 1830, indicating mode change of the graphical object 10.

When a long touch is entered on the graphical object 10 in a state of screen 1820 or screen 1830, the control unit 110 may change the shape of the graphical object 10 as illustrated in screen 1840, indicating another mode change of the graphical object 10.

When a long touch event is generated by touching the menu key in a state of screen 1820, 1830 or 1840 (i.e., in a state in which the graphical object 10 is displayed on the screen), the control unit 110 may remove the graphical object 10 as illustrated in screen 1810.

In FIG. 18, the graphical object 10 is described as operating in one of two modes. Alternatively, as one example, when the graphical object 10 is assumed to have five modes, the control unit 110 may change from the first mode to the fifth mode circularly whenever a touch event occurs on the graphical object 10.

Figure 19:
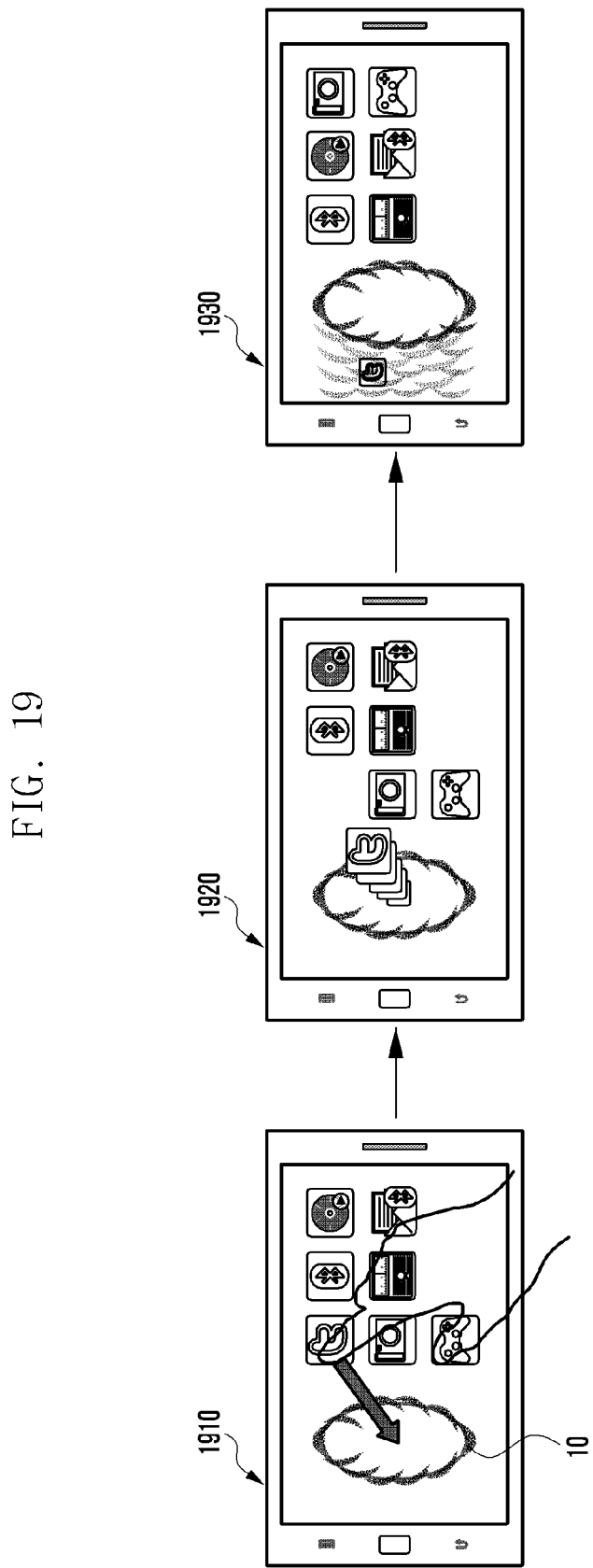
FIG. 19 is a diagram illustrating screen representations for controlling a content item using a graphical object created through an external key, according to an embodiment of the present invention.

FIG. 19 is a diagram of screen representations illustrating control of a content item using a graphical object created through an external key.

Referring to FIG. 19, when a long touch event occurs on the menu key, the control unit 110 may create a graphical object 10 at a preset region as illustrated in screen 1910. When a content item on the screen is dragged and dropped on the graphical object 10, the touchscreen 130 outputs visual effects depicting the content item flowing into the graphical object 10 as illustrated in screen 1920. Thereafter, the control unit 110 may change the shape of the graphical object 10 to a first shape and display the moved content item within the region of the graphical object 10 as illustrated in screen 1930, because the first mode is set as the default mode of the graphical object 10.

In FIG. 19, the default mode of the graphical object 10 is set to a first mode. However, the default mode is changed according to user selection. For example, assume that the default mode of the graphical object 10 is set to a second mode (content transfer mode). When a content item is dragged and dropped on the graphical object 10 in a state in which the mode of the graphical object 10 is not specified as illustrated in screen 1920, the control unit 110 may change the mode of the graphical object 10 to the second mode and operate accordingly.

According to an aspect of the present invention, the content control method based on a graphical object is implemented with computer programs and is stored in various computer readable storage media. The computer readable storage media may store program instructions, data files, data structures and combinations thereof. The program instructions may include instructions developed specifically for the present invention and existing general-purpose instructions. The computer readable storage media may include magnetic media such as a hard disk and floppy disk, optical media such as a CD-ROM and DVD, magneto-optical media such as a floptical disk, and memory devices such as a ROM and RAM. The program instructions may include machine codes produced by compilers and high-level language codes executable through interpreters.

According to an aspect of the present invention, the content control method and apparatus enable the user to control a mobile terminal using a graphical object through touch inputs in an easy and convenient manner. By using the graphical object created on the screen, the user may easily copy, delete, move, transfer and compress content items, change attributes thereof and view content items in another mobile terminal through touch input. The user may easily activate various functions of the mobile terminal using the graphical object without separate menu or key commands, through a differentiated user interface, which increases user convenience when using the mobile terminal and improves competitiveness of the mobile terminal.

Although various embodiments of the present invention have been described in detail herein, many variations and modifications may be made without departing from the spirit and scope of the present invention as defined by the appended claims.

What is claimed is:

1. A method for content control based on a graphical object in a terminal, comprising:
    detecting a first touch input, the first touch input being a multi-touch gesture including at least two touch points;
    displaying a graphical object at a region associated with the first touch input, the graphical object being displayed with a first graphical characteristic corresponding to a first function, a size of the graphical object being adjusted dynamically as a user changes the distance between the two touch points while the first touch input is maintained;
    detecting a second touch input on the graphical object, the second touch input being for changing the first function to a second function;
    in response to the second touch input, changing the first graphical characteristic of the graphical object to a second graphical characteristic corresponding to the second function;
    detecting a third touch input on a content item, the third touch input being a drag gesture from the content item to the graphical object;
    displaying the content item to be moved into the graphical object according to the third touch input; and
    executing the second function to control the content item according to the second function.

2. The method of claim 1, further comprising in response to releasing the third touch input, displaying the content item within the graphical object.

3. The method of claim 1, further comprising while the first touch input is maintained, receiving the second touch input on the region where the graphical object is displayed, wherein the second touch input causes the function to change to a second function; and
    changing the first graphical characteristic of the graphical object to a second graphical characteristic corresponding to the second function.

4. The method of claim 3, wherein changing the second function further comprises changing at least one of a shape and a color of the graphical object.

5. The method of claim 3, wherein changing the second function comprises:
    setting the second function to a content display function when a tap input is detected on the graphical object; and
    setting the second function to a first transfer function when a long touch input is detected on the graphical object.

6. The method of claim 1, wherein executing the second function comprises at least one of:
    automatically determining the second function depending on the application being executed at a creation time of the graphical object;
    determining the second function depending on communication connection states of the terminal; and
    outputting a function selection list at the creation time of the graphical object and setting the function to a function selected from the function selection list.

7. The method of claim 1, wherein executing the second function comprises:
    establishing, when a transmission request is issued in a state in which the second function is a transfer function, a communication channel with a preset server; and
    sending the content item to the preset server.

8. The method of claim 1, wherein the first touch input includes a stretch gesture or a pinch gesture.

9. The method of claim 1, wherein displaying the graphical object, when the multi-touch gesture is detected, comprises:
    displaying a graphical object when a stretch or pinch interaction in a preset first direction is detected; and
    performing a screen zoom-in operation when a stretch input in a preset second direction is detected, and performing a screen zoom-out operation when a pinch input in the preset second direction is detected.

10. The method of claim 1, wherein the graphical object is movable.

11. The method of claim 1, wherein the graphical object is removed from a screen of the terminal when the first touch input is released.

12. An apparatus for content control based on a graphical object in a terminal, comprising:
    a touchscreen; and
    a control unit detecting a first touch input, the first touch input being a multi-touch gesture including at least two touch points, displaying a graphical object at a region associated with the first touch input, the graphical object being displayed with a first graphical characteristic corresponding to a first function, detecting a second touch input on the graphical object, the second touch input being for changing the first function to a second function; in response to the second touch input, changing the first graphical characteristic of the graphical object to a second graphical characteristic corresponding to the second function; detecting a third touch input on a content item the third touch input being a drag gesture from the content item to the graphical object, displaying the content item to be moved into the graphical object according to the third touch input, and executing the second function to control the content item according to the second function,
    wherein, while the first touch input is maintained, the control unit dynamically adjusts a size of the graphical object as a user changes the distance between the first touch point and the second touch point.

13. The apparatus of claim 12, wherein the control unit in response to releasing the third touch input, displays the content item within the graphical object.

14. The apparatus of claim 12, wherein the control unit while the first touch input is maintained, receives the third touch input on the region where the graphical object is displayed, wherein the third touch input causes the function to change to a second function; and changes the first graphical characteristic of the graphical object to a second graphical characteristic corresponding to the second function.

15. The apparatus of claim 12, wherein the control unit automatically determines the second function depending on the application being executed at a creation time of the graphical object, determines the function depending on communication connection states of the terminal, or outputs a function selection list at the creation time of the graphical object and sets the function to a function selected from the function selection list.

16. The apparatus of claim 15, wherein the control unit changes at least one of a shape and a color of the graphical object according to the function change.

17. The apparatus of claim 12, wherein the first touch input includes a stretch gesture or a pinch gesture.

18. The apparatus of claim 12, wherein the control unit, when the multi-touch gesture is detected, displays a graphical object when a stretch or pinch input in a preset first direction is detected, performs a screen zoom-in operation when a stretch input in a preset second direction is detected and performs a screen zoom-out operation when a pinch input in the preset second direction is detected.

19. The apparatus of claim 12, wherein, when the graphical object is displayed, the control unit displays content items, which are stored in a storage region allocated to the graphical object, on the graphical object, so that the content items at most partially overlap each other.

20. The apparatus of claim 12, wherein the control unit sets the second function to a content display function when a tap input is detected on the graphical object, and sets the second function to a first transfer function when a long touch input is detected on the graphical object.

21. The apparatus of claim 12, wherein the graphical object is movable.

22. The apparatus of claim 12, wherein the graphical object is removed from the touchscreen when the first touch input is released.

* * * * *

UNITED STATES PATENT AND TRADEMARK OFFICE
CERTIFICATE OF CORRECTION

PATENT NO.           : 9,727,225 B2
APPLICATION NO.      : 13/546681
DATED                : August 8, 2017
INVENTOR(S)          : Taik Heon Rhee et al.

It is certified that error appears in the above-identified patent and that said Letters Patent is hereby corrected as shown below:

Column 24, Claim 7, Line 4:
"state in which the second function is a transfer function,"
Should be:
-- "state in which a function is a transfer function, --

Signed and Sealed this
Fifth Day of June, 2018

Andrei Iancu
*Director of the United States Patent and Trademark Office*